US012181679B2

(12) United States Patent
Schmulen et al.

(10) Patent No.: US 12,181,679 B2
(45) Date of Patent: Dec. 31, 2024

(54) DIFFRACTIVE OPTICAL ELEMENTS WITH MITIGATION OF REBOUNCE-INDUCED LIGHT LOSS AND RELATED SYSTEMS AND METHODS

(71) Applicant: Magic Leap, Inc., Plantation, FL (US)

(72) Inventors: Jeffrey Dean Schmulen, Austin, TX (US); Neal Paul Ricks, Plantation, FL (US); Samarth Bhargava, Saratoga, CA (US); Kevin Messer, Mountain View, CA (US); Victor Kai Liu, Mountain View, CA (US); Matthew Grant Dixon, Palm Beach Gardens, FL (US); Xiaopei Deng, Cedar Park, TX (US); Marlon Edward Menezes, Austin, TX (US); Shuqiang Yang, Austin, TX (US); Vikramjit Singh, Pflugerville, TX (US); Kang Luo, Austin, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/319,745

(22) Filed: May 18, 2023

(65) Prior Publication Data

US 2023/0341692 A1 Oct. 26, 2023

Related U.S. Application Data

(60) Continuation of application No. 17/379,919, filed on Jul. 19, 2021, now Pat. No. 11,693,246, which is a
(Continued)

(51) Int. Cl.
*G02B 6/34* (2006.01)
*F21V 8/00* (2006.01)
(Continued)

(52) U.S. Cl.
CPC ....... *G02B 27/0172* (2013.01); *G02B 6/0026* (2013.01); *G02B 6/26* (2013.01);
(Continued)

(58) Field of Classification Search
CPC .... G02B 27/0172; G02B 6/0026; G02B 6/26; G02B 27/1046; G02B 27/4233; G02B 6/10; G02B 6/34; G06T 19/006
See application file for complete search history.

(56) References Cited

U.S. PATENT DOCUMENTS 6,850,221 B1 2/2005 Tickle
8,061,882 B2 11/2011 Bita et al.
(Continued)

FOREIGN PATENT DOCUMENTS

CN 102707368 A 10/2012
EP 2244114 A1 10/2010
(Continued)

OTHER PUBLICATIONS

EP19842278.4 Examination Report dated Feb. 5, 2024.
(Continued)

*Primary Examiner* — Jennifer Doan
(74) *Attorney, Agent, or Firm* — Tobias Intelletual Property Law, PLLC

(57) ABSTRACT

Display devices include waveguides with in-coupling optical elements that mitigate re-bounce of in-coupled light to improve overall in-coupling efficiency and/or uniformity. A waveguide receives light from a light source and/or projection optics and includes an in-coupling optical element that in-couples the received light to propagate by total internal reflection in a propagation direction within the waveguide. Once in-coupled into the waveguide the light may undergo re-bounce, in which the light reflects off a waveguide surface and, after the reflection, strikes the in-coupling optical
(Continued)

element. Upon striking the in-coupling optical element, the light may be partially absorbed and/or out-coupled by the optical element, thereby effectively reducing the amount of in-coupled light propagating through the waveguide. The in-coupling optical element can be truncated or have reduced diffraction efficiency along the propagation direction to reduce the occurrence of light loss due to re-bounce of in-coupled light, resulting in less in-coupled light being prematurely out-coupled and/or absorbed during subsequent interactions with the in-coupling optical element.

19 Claims, 34 Drawing Sheets

Related U.S. Application Data division of application No. 16/520,217, filed on Jul. 23, 2019, now Pat. No. 11,067,808.

(60) Provisional application No. 62/747,032, filed on Oct. 17, 2018, provisional application No. 62/702,707, filed on Jul. 24, 2018.

(51) Int. Cl.
*G02B 6/26* (2006.01)
*G02B 27/01* (2006.01)
*G02B 27/10* (2006.01)
*G02B 27/42* (2006.01)
*G06T 19/00* (2011.01)
*G02B 6/10* (2006.01)

(52) U.S. Cl.
CPC ..... *G02B 27/1046* (2013.01); *G02B 27/4233* (2013.01); *G06T 19/006* (2013.01); *G02B 6/10* (2013.01)

(56) References Cited

U.S. PATENT DOCUMENTS

| | | | |
|---|---|---|---|
| 9,081,426 B2 | 7/2015 | Armstrong | |
| 9,215,293 B2 | 12/2015 | Miller | |
| 9,348,143 B2 | 5/2016 | Gao et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,696 B2 * | 10/2017 | Woltman | G02B 27/0081 |
| 9,791,700 B2 | 10/2017 | Schowengerdt | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 10,095,045 B2 * | 10/2018 | Robbins | G02B 27/4261 |
| 11,693,246 B2 | 7/2023 | Schmulen et al. | |
| 2003/0086655 A1 | 5/2003 | Deacon | |
| 2004/0156589 A1 | 8/2004 | Gunn et al. | |
| 2006/0028436 A1 | 2/2006 | Armstrong | |
| 2007/0081123 A1 | 4/2007 | Lewis | |
| 2008/0062509 A1 | 3/2008 | Uemura | |
| 2009/0190373 A1 | 7/2009 | Bita et al. | |
| 2010/0014024 A1 | 1/2010 | Tatsumi et al. | |
| 2012/0120493 A1 | 5/2012 | Simmonds et al. | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2014/0306866 A1 | 10/2014 | Miller et al. | |
| 2015/0001677 A1 | 1/2015 | Palumbo et al. | |
| 2015/0016777 A1 | 1/2015 | Abovitz et al. | |
| 2015/0086153 A1 | 3/2015 | Ono et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0033784 A1 | 2/2016 | Levola et al. | |
| 2016/0116739 A1 | 4/2016 | TeKolste et al. | |
| 2017/0235142 A1 | 8/2017 | Wall et al. | |
| 2017/0293145 A1 | 10/2017 | Miller et al. | |
| 2017/0329075 A1 | 11/2017 | Yeoh et al. | |
| 2018/0143470 A1 | 5/2018 | Oh et al. | |
| 2018/0299607 A1 | 10/2018 | Menezes et al. | |
| 2020/0033604 A1 | 1/2020 | Schmulen et al. | |

FOREIGN PATENT DOCUMENTS

| | | | |
|---|---|---|---|
| JP | H0882703 A | | 3/1996 |
| JP | 2007011057 A | | 1/2007 |
| JP | 2016188901 A | | 11/2016 |
| WO | 2017014105 A1 | | 1/2017 |
| WO | 2017222808 A1 | | 12/2017 |
| WO | 2020023546 A1 | | 1/2020 |

OTHER PUBLICATIONS

ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/raskar/book/BimberRaskarAugmentedRealityBook.pdf.
Extended European Search Report dated Mar. 21, 2022 for EP19842278.4.
International Preliminary Report on Patentability for PCT Application No. PCT/US2019/043103, dated Jan. 26, 2021.
International Search Report and Written Opinion for PCT Application No. PCT/US2019/043103, dated Nov. 15, 2019.
Invitation to Pay Additional Fees for PCT Application No. PCT/US2019/043103, dated Sep. 12, 2019.
Jacob, "Eye tracking in Advanced interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
JP2021-503153 Official Action mailed Apr. 26, 2023.
Tanriverdi and Jacob, "Interacting With Eye Movements in Virtual Environments," Department of Electrical Engineering and Computer Science, Tufts University, Medford, MA-paper/Proc. AMC CHI 2000 Human Factors in Computing Systems Conference, pp. 265-272, Addison-Wesley/ACM Press (2000).
JP2023-120831 Office Action mailed Jun. 3, 2024.

* cited by examiner

| ICG Width Reduction | ICG Launch | EPE User-Side | Efficiency | ΔEfficiency |
|---|---|---|---|---|
| 0μm | 40×30 FOV | | Eyebox= 0.49% EPE User-Side= 2.5% | Δ= 0% |
| 100μm from Nasal Side | | | Eyebox= 0.55% EPE User-Side= 2.9% | Δ= 12% |
| 200μm from Nasal Side | | | Eyebox= 0.61% EPE User-Side= 3.2% | Δ= 24% |
| 300μm from Nasal Side | | | Eyebox= 0.64% EPE User-Side= 3.5% | Δ= 31% |
| 400μm from Nasal Side | | | Eyebox= 0.64% EPE User-Side= 3.5% | Δ= 31% |
| 500μm from Nasal Side | | | Eyebox= 0.63% EPE User-Side= 3.4% | Δ= 29% |

FIG. 16

Type 2 Inorganic/Aqueous Silver Ion Thermal Decomposition

$2Ag(NH_3)_2CH_3CO_2 + NH_4CO_2 \xrightarrow{\Delta} 2Ag + 5NH_3 + 2CH_3CO_2H + CO_2 + H_2O$ $2Ag(NH_3)_2CH_3CO_2 + NH_4CO_2 \longrightarrow Ag + AgCH_3CO_2 + 5NH_3 + CH_3CO_2H + CO_2 + H_2O$

Type 3 Wet Chemical Ag+ Ion Reduction

DIFFRACTIVE OPTICAL ELEMENTS WITH MITIGATION OF REBOUNCE-INDUCED LIGHT LOSS AND RELATED SYSTEMS AND METHODS

PRIORITY CLAIM

This application is a continuation of U.S. patent application Ser. No. 17/379,919, filed on Jul. 19, 2021, titled "DIFFRACTIVE OPTICAL ELEMENTS WITH MITIGATION OF REBOUNCE-INDUCED LIGHT LOSS AND RELATED SYSTEM AND METHODS." which is a divisional of U.S. patent application Ser. No. 16/520,217, filed on Jul. 23, 2019, titled "DIFFRACTIVE OPTICAL ELEMENTS WITH MITIGATION OF REBOUNCE-INDUCED LIGHT LOSS AND RELATED SYSTEM AND METHODS." which claims priority under 35 U.S.C. § 119 (e) from U.S. Provisional Application No. 62/702,707, filed on Jul. 24, 2018, titled "DIFFRACTIVE OPTICAL ELEMENTS WITH MITIGATION OF REBOUNCE-INDUCED LIGHT LOSS AND DISPLAY DEVICES CONTAINING THE SAME." and from U.S. Provisional Application No. 62/747,032, filed on Oct. 17, 2018, titled "WAVEGUIDES HAVING HIGHLY REFLECTIVE LAYERS AND METHODS FOR FORMING." all of which are hereby incorporated by reference in their entirety and for all purposes.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; and U.S. application Ser. No. 15/954,419, filed Apr. 16, 2018.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

Some aspects include a display system for projecting images to an eye of a user. The display system comprises a waveguide comprising a first major surface and a second major surface opposite the first major surface, projection optics configured to project a beam of light toward the second major surface of the waveguide, and an in-coupling optical element disposed on the second major surface of the waveguide, the in-coupling optical element comprising a diffractive region configured to in-couple light from the projection optics, wherein the in-coupling optical element is configured to redirect the light from the projection optics to propagate by total internal reflection in a first direction within the waveguide. The diffractive region is sized and shaped such that a first portion of the beam of light from the projection optics is incident on the diffractive region and a second portion of the beam of light from the projection optics impinges on the waveguide without being incident on the diffractive region.

The diffractive region may be a high-efficiency diffractive region, the in-coupling optical element further comprising a low-efficiency diffractive region sized and shaped such that the second portion of the beam of light from the projection optics is incident on the low-efficiency diffractive region. The high-efficiency diffractive region may be a reflective diffractive region comprising a metalized grating portion, and the low-efficiency diffractive region may comprise a non-metalized grating portion. The second portion of the beam of light may propagate out of the waveguide through the second major surface without being in-coupled into the waveguide. The second portion of the beam of light may be in-coupled into the waveguide at a lower efficiency relative to the first portion of the beam of light. The diffractive region may be reflectively asymmetric about an axis of symmetry perpendicular to the propagation direction at a beam axis of the beam of light from the projection optics. The waveguide may be part of a waveguide stack, the waveguide stack further comprising a second waveguide comprising a first major surface and a second major surface, and a second in-coupling optical element disposed on the second major surface of the second waveguide, the second in-coupling optical element comprising a second diffractive region covering a larger proportion of an area defined by a second beam of light from the projection optics, relative to a proportion covered by the diffractive region of an area defined by the beam of light. The second diffractive region may be configured to in-couple substantially all of the second beam of light. The diffractive region of the first waveguide may be reflectively asymmetric about an axis of symmetry perpendicular to the propagation direction at a beam axis of the beam of light from the projection optics, and the second diffractive region may be reflectively symmetric about a second axis of symmetry perpendicular to the propagation direction at a beam axis of the second beam of light. The second waveguide may be disposed between the waveguide and the projection optics, and the waveguide may be spaced from the projection optics by a distance greater than a focal distance of the projection optics.

Some aspects include a waveguide comprising a first major surface, a second major surface, and an in-coupling diffractive optical element disposed on the second major surface, the in-coupling optical element comprising a diffractive region configured to in-couple incident light, wherein a width of the diffractive region parallel to the propagation direction is shorter than a length of the diffractive region perpendicular to the propagation direction.

The width of the diffractive region may be less than 80% of the length of the diffractive region. The diffractive region may be a high-efficiency diffractive region, the in-coupling diffractive optical element further comprising a low-efficiency diffractive region disposed adjacent to the high-efficiency diffractive region along the propagation direction. The high-efficiency diffractive region may be a reflective diffractive region comprising a metalized diffraction grating portion, and the low-efficiency diffractive region may comprise a non-metalized diffraction grating portion. The high-efficiency diffractive region and the low-efficiency diffractive region may form a partially metalized diffraction grating, wherein the diffraction grating is metalized in the high-efficiency diffractive region and non-metalized in the low-efficiency diffractive region. The in-coupling diffractive optical element may be sized and shaped to reduce an occurrence of re-bounce of in-coupled light in comparison to an in-coupling optical element having a substantially equal length and width.

Some aspects include a waveguide stack for a head-mounted display system. The waveguide stack comprises a first waveguide comprising a first major surface, a second major surface opposite the first major surface, and a first in-coupling diffractive optical element disposed on the second major surface, the first in-coupling diffractive optical element comprising a first diffractive region configured to redirect incident light from a light source to propagate by total internal reflection in a propagation direction within the first waveguide; and a second waveguide comprising a first major surface, a second major surface opposite the first major surface of the second waveguide, and a second in-coupling diffractive optical element disposed on the second major surface of the second waveguide, the second in-coupling diffractive optical element comprising a second diffractive region configured to redirect incident light from the light source to propagate by total internal reflection in the propagation direction within the second waveguide. A width-to-length ratio of the second diffractive region is smaller than a width-to-length ratio of the first diffractive region.

The waveguide stack may be spaced from the light source such that a distance between the light source and the first diffractive region is at a focal distance of the light source, such that a distance between the light source and the second diffractive region is greater than the focal distance. The width-to-length ratio of the first diffractive region may be greater than 80%, and the width-to-length ratio of the second diffractive region may be less than 80%. The second diffractive region may be a high-efficiency diffractive region, and the second in-coupling diffractive optical element may further comprise a low-efficiency diffractive region disposed immediately adjacent to the high-efficiency diffractive region along the propagation direction. The high-efficiency diffractive region may comprise a metalized portion of a diffraction grating, and the low-efficiency diffractive region may comprise a non-metalized portion of the diffraction grating. The second in-coupling diffractive optical element may be sized and shaped to reduce the occurrence of re-bounce of in-coupled light in comparison to an in-coupling diffractive optical element having a width-to-length ratio equal to the width-to-length ratio of the first diffractive region.

Some aspects include a method of making an optical waveguide structure comprising a reflective layer. The method comprises providing an optical waveguide comprising a surface, the surface comprising a region comprising a pattern of protrusions; depositing a liquid mixture on at least part of the region, the liquid mixture comprising a metal salt; and forming the reflective layer by coating the region with the metal of the metal salt, wherein coating the region comprises precipitating the metal onto the region by dissociating metal from the metal salt.

Dissociating metal from the metal salt may comprise reducing the metal salt by exposure to a reducing agent. The reducing agent mat comprise at least one of a carbohydrate comprising an alpha-hydroxy aldehyde or a carbohydrate comprising an alpha-hydroxy ketone. The liquid mixture may comprise the reducing agent. The method may further comprise adding the reducing agent to the liquid mixture after depositing the liquid mixture. Forming the reflective layer may comprise selectively forming the reflective layer on the region while leaving one or more areas around the region free of the metal. The surface of the waveguide may comprise a vertically-extending wall that defines a volume in the region, wherein depositing the liquid mixture comprises depositing the depositing mixture into the volume. The protrusions may define a diffractive optical element, wherein the protrusions and reflective layer form a reflective diffractive optical element. The diffractive optical element may be an in-coupling optical element configured to redirect incident light at angles such that the light propagates through the waveguide by total internal reflection. The protrusions may comprise photoresist. The method may further comprise forming an additional reflective layer on an additional optical waveguide by depositing the liquid mixture on an additional region of a surface of the additional optical waveguide, wherein the additional reflective optical element is configured to reflect incident light; and attaching at least the additional waveguide to a surface of the waveguide, thereby producing a stack of waveguides. A hydrophilicity of the region may be increased by a selectively pretreating, prior to depositing the liquid mixture, the region with one or more agents selected from the group consisting of: a plasma, a surfactant, a coating, a wet chemical etchant, and a catalyst. Pretreating the region with plasma may comprise performing an atmospheric plasma treatment. The wet chemical etch agent may comprise chromic acid. The coating may comprise silica. The catalyst may comprise tin or palladium. The method may further comprise, prior to depositing the liquid mixture, selectively applying a catalyst to the region, the catalyst configured to expedite the reduction of the silver salt. The liquid mixture may consist essentially of the metal salt, a reducing agent, and a base. The reflective layer may be pure or substantially pure metal. The liquid mixture may be deposited on the region by at least one of: nano-dispensing, micro-dispensing, micropipetting, inkjet printing, and spraying. The method may further comprise removing residual liquid mixture material following the precipitation of the metal. Removing residual liquid crystal mixture may comprise rinsing the optical waveguide. The method may further comprise depositing a capping layer on the reflective layer. The reflective layer may be free or substantially free of pinholes. The metal may be silver.

Some aspects include n optical device comprising a first waveguide comprising a reflective diffractive optical element. The reflective diffractive optical element comprises protrusions on a surface of the first waveguide; an interface layer on the protrusions; and a reflective layer on the interface layer.

The interface layer may comprise one or more of a plasma-treated surface, a surfactant layer, and a catalyst. The catalyst may comprise one more of tin or palladium-containing compounds. The reflective layer may be at least 95% metal. The reflective layer may be substantially free of pinholes. The reflective diffractive optical element may be an in-coupling optical element configured to redirect incident light at angles such that the light propagates through the first waveguide by total internal reflection. The reflective layer may reflect the incident light with a reflectivity of at least 85%. The optical device may further comprise a second waveguide and a third waveguide, wherein the second waveguide is configured to output light of a different range of wavelengths than the third waveguide, wherein each of the first, second, and third waveguides comprises a reflective diffractive optical element comprising protrusions on a surface of the first waveguide; an interface layer on the protrusions; and a reflective layer on the interface layer. The first surface may comprise a wall that defines a boundary of the reflective layer. The wall may comprise a mechanical spacer configured to maintain space between the first waveguide and an other waveguide. The optical device may be a display system comprising a spatial light modulator, wherein the spatial light modulator is configured to output light containing image information onto the reflective diffractive optical element. The optical device may further comprise a capping layer on the reflective layer.

BRIEF DESCRIPTION OF THE DRAWINGS

FIGS. 16 and 17 illustrate examples of enhanced in-coupling efficiency due to in-coupling optical element truncation.

DETAILED DESCRIPTION

Figure 1:
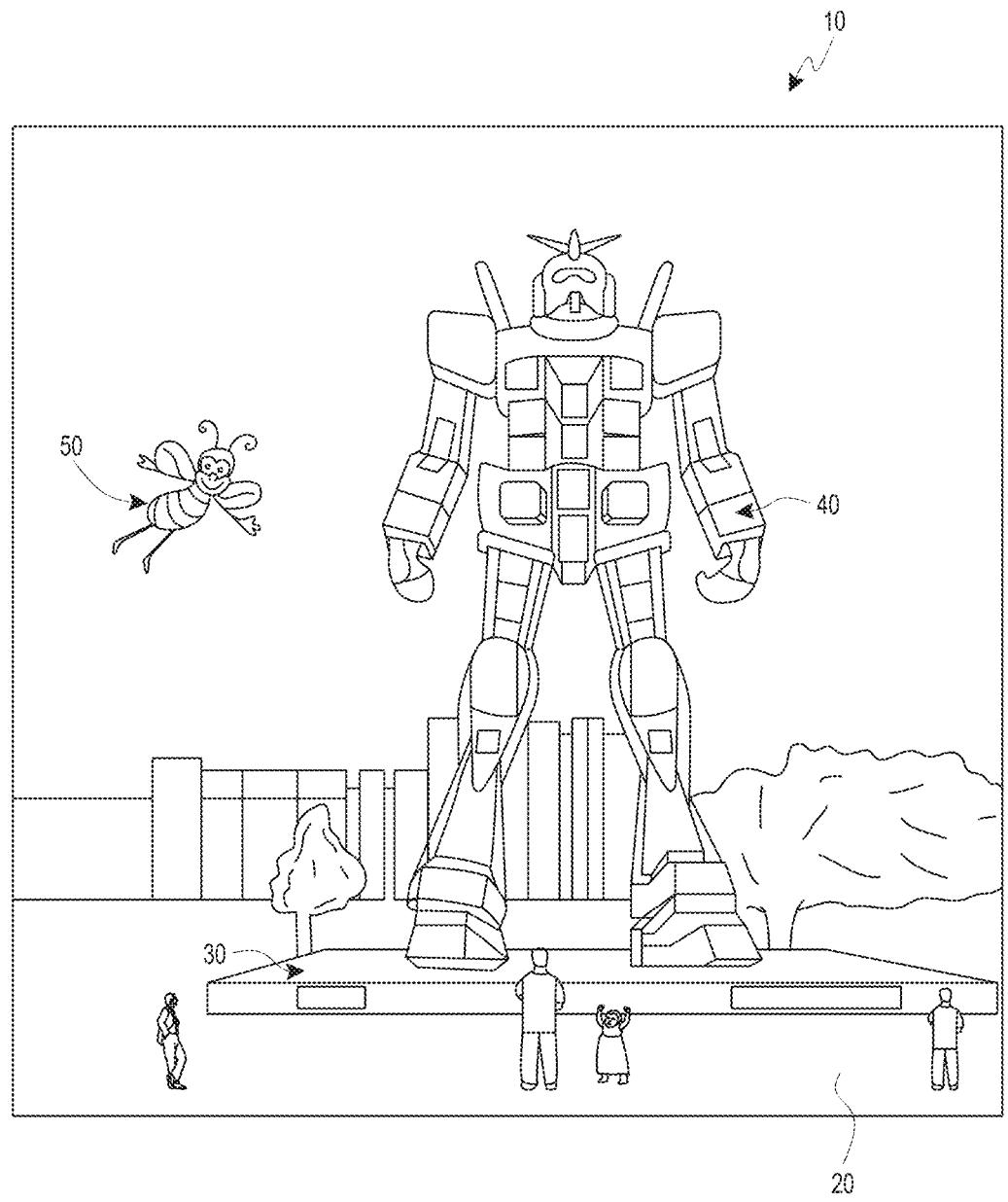
FIG. 1 illustrates a user's view of augmented reality (AR) through an AR device.

AR and/or VR systems may display virtual content to a user, or viewer. Preferably, this content is displayed on a head-mounted display, e.g., as part of eyewear, that projects image information to the user's eyes. In addition, where the system is an AR system, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some display systems, a plurality of waveguides, constituting a stack of waveguides may be configured to form virtual images at a plurality of virtual depth planes (also referred to simply a "depth planes" herein) perceived to be at different distances away from the user. In some embodiments, different waveguides of the stack of waveguides may have optical structures providing different optical powers and may simulate the wavefront divergence of light propagating from objects at different distances from the user's eye. In some embodiments, as an alternative to, or in addition to waveguide optical structures for providing optical power, the display systems may also include a plurality lenses that provide or additionally provide optical powers. Light from an image source may be directed toward the waveguides, and may be in-coupled into individual waveguides by an in-coupling optical element of each waveguide. The in-coupling optical element may be a diffractive optical element, such as a grating.

In some embodiments, systems and methods described herein include in-coupling optical elements configured to enhance in-coupling efficiency and/or the uniformity of in-coupled light by reducing the occurrence of light loss due to re-bounce of in-coupled light. Re-bounce occurs when in-coupled light propagating along a waveguide strikes the in-coupling optical element a second or subsequent time after the initial in-coupling incidence. As will be described in greater detail, re-bounce may result in a portion of the in-coupled light being undesirably out-coupled and/or absorbed by a material of the in-coupling optical element. The out-coupling and/or light absorption undesirably may cause a reduction in overall in-coupling efficiency and/or uniformity of the in-coupled light.

Some embodiments disclosed herein provide diffractive optical elements which may also be in-coupling optical elements and which are configured to mitigate light loss due to re-bounce of light in-coupled in a waveguide. Upon in-coupling incident light, the diffractive optical element may redirect the light such that it generally propagates through the waveguide and a propagation direction. In some cases, re-bounce of in-coupled light occurs towards the side of the in-coupling optical element in the propagation direction. For example, some incident light initially in-coupled near the opposite side of the in-coupling optical element (opposite the propagation direction) may re-bounce, that is, may strike the in-coupling optical element again after reflecting off another surface of the waveguide. Without being limited by theory, upon striking the in-coupling optical element again, some of the incident light may undesirably be out-coupled by the optical element and/or may be absorbed by the optical element (e.g. absorbed by a reflective coating on a diffractive grating in cases where the in-coupling optical element is a reflective diffractive optical element).

In some embodiments, to mitigate light loss due to re-bounce, an in-coupling optical element is truncated in the propagation direction side of the optical element. Advantageously, the truncation may reduce the occurrence of light loss caused by re-bounce by reducing the available area of the in-coupling optical element at which re-bounce is likely to result in undesirable light loss. In some embodiments, the truncation may be a complete truncation of all structures of the in-coupling optical element, e.g., the truncation may involve reducing the area of the in-coupling optical element in the direction of light propagation. In some other embodiments, where the in-coupling optical element comprises a reflective coating (e.g., a reflective layer such as a metal layer), a portion of the in-coupling optical element at the propagation direction side may not be coated, such that portions of the optical element in the propagation direction side absorb less re-bouncing light and/or out-couple re-bouncing light with a lower efficiency. In some embodiments, as seen in a top-down view, a diffractive region of an in-coupling optical element may have a width along a propagation direction that is shorter than its length perpendicular to the propagation direction, may have a smaller width-to-length ratio relative to a non-truncated diffractive region, and/or may be sized and shaped such that a first portion of a beam of light from projection optics is incident on the diffractive region and a second portion of the beam of light impinges on the waveguide without being incident on the diffractive region (e.g., the portion of the optical element having high absorption and/or out-coupling efficiency is preferably smaller in size than the area made out by an incident beam of light on the waveguide). In some embodiments, over a stack of waveguides, the amount of truncation varies between waveguides. For example, the width-to-length ratios of the in-coupling optical elements of each waveguide may vary between different waveguides of the stack of waveguides.

Waveguides may use optical elements to in-couple external light and/or to redirect light propagating within the waveguide in desired directions. For example, the optical elements may take the form of diffractive gratings and/or faceted features. Some optical elements may work in the reflective mode, in which light incident on the optical element from one or more angles is both reflected and redirected such that it propagates away from the optical elements at a different desired angle. As disclosed herein, such waveguides may form parts of display systems, such as augmented reality and virtual reality display systems. For example, the waveguides may be configured to in-couple light containing image information, and to distribute and out-couple that light to a user. Example waveguides and optical elements will be discussed in greater detail herein. The reflective optical elements may include reflective layers formed by wet chemistries, which may advantageously provide superior diffraction efficiencies, as discussed herein.

Reference will now be made to the drawings, in which like reference numerals refer to like parts throughout. Unless indicated otherwise, the drawings are schematic and not necessarily drawn to scale.

Example Display Systems

Figure 2:
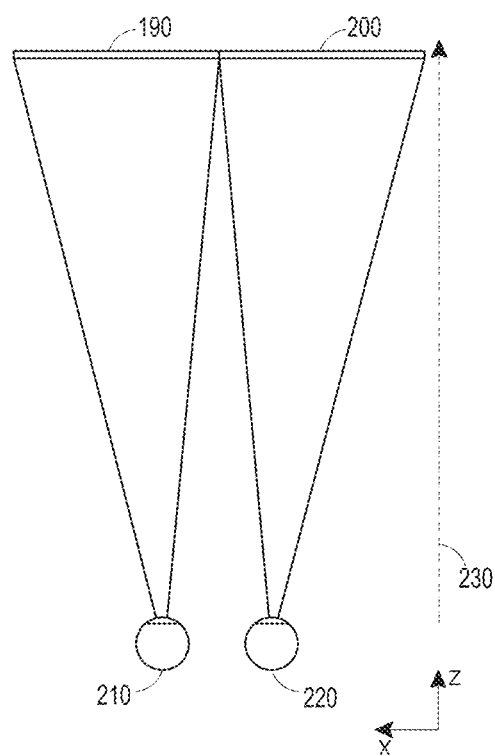
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
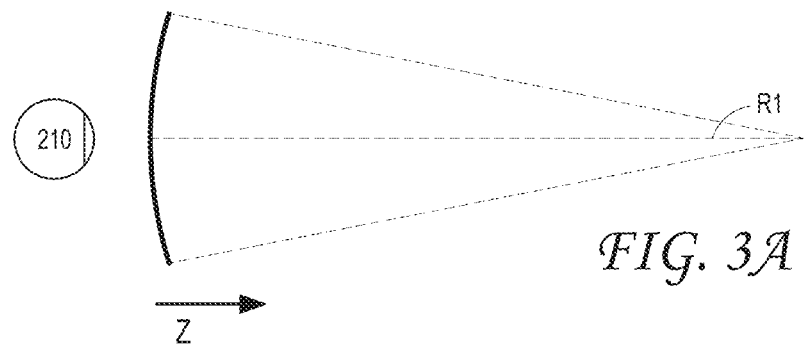
FIGS. 3A-3C illustrate relationships between radius of curvature and focal radius.
Figure 3B:
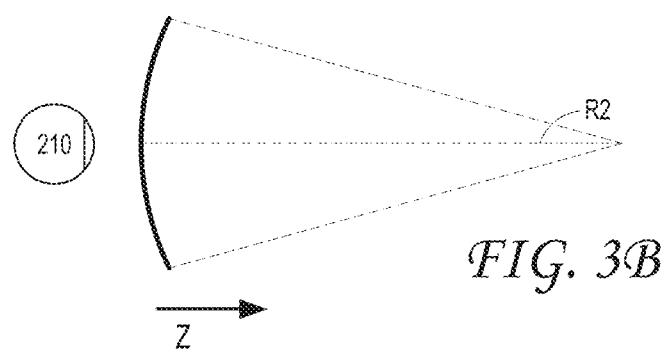
Figure 3C:
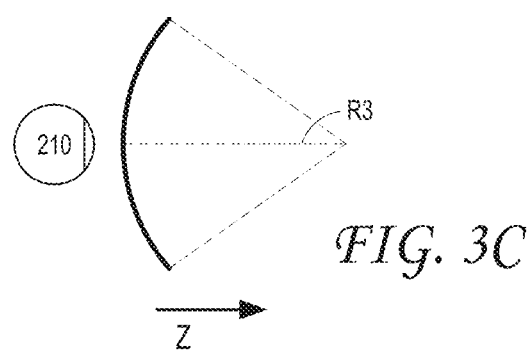

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
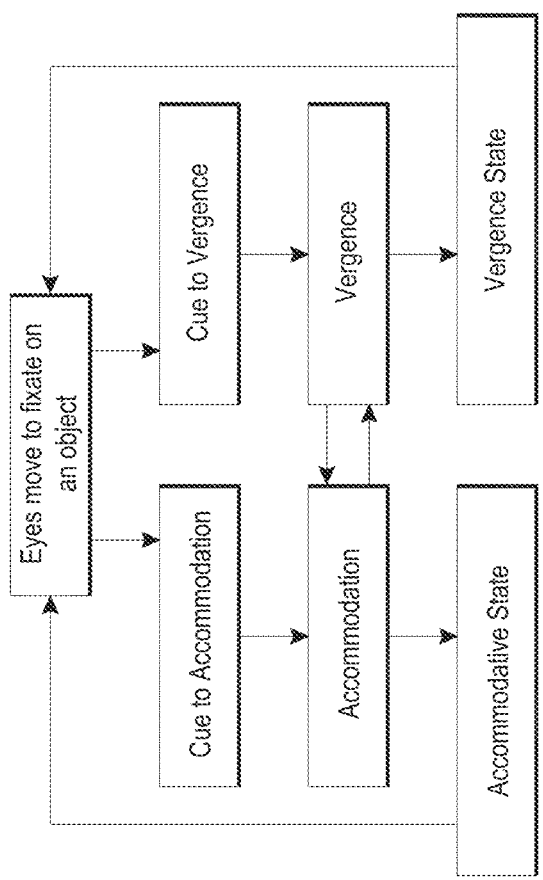
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
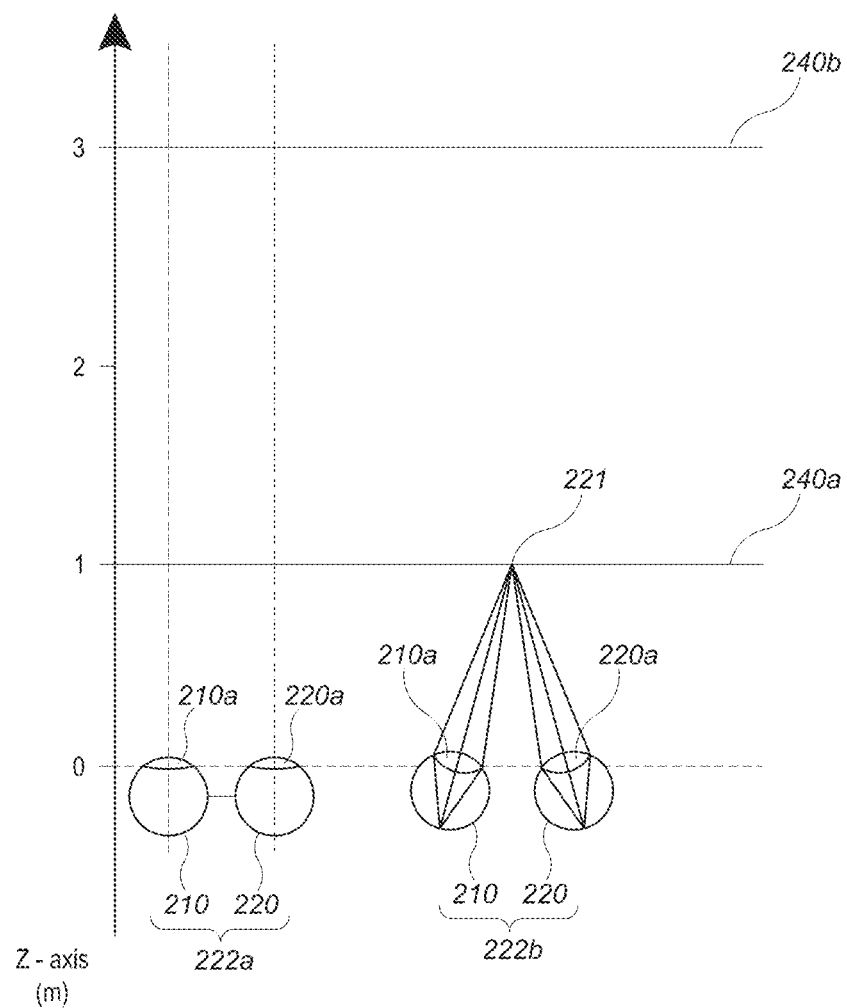
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
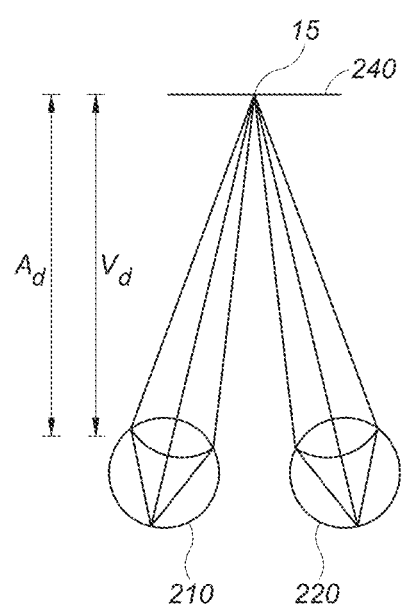
FIG. 4C illustrates an example of a representation of a top-down view of a user viewing content via a display system.
Figure 4D:
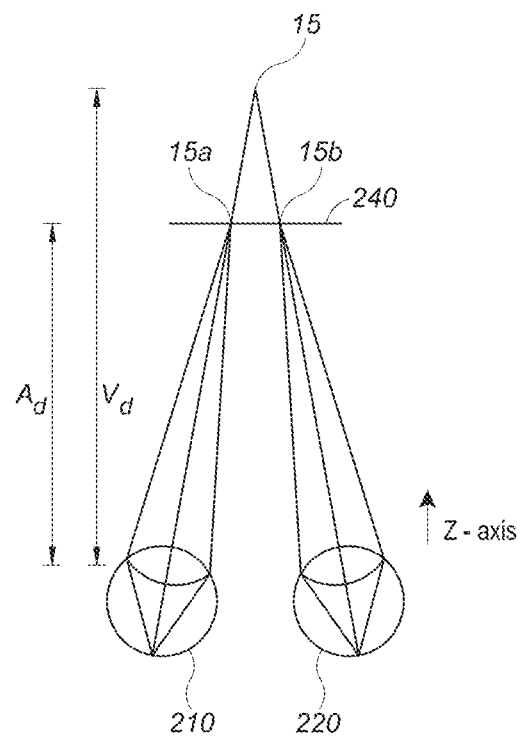
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d-A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Figure 6:
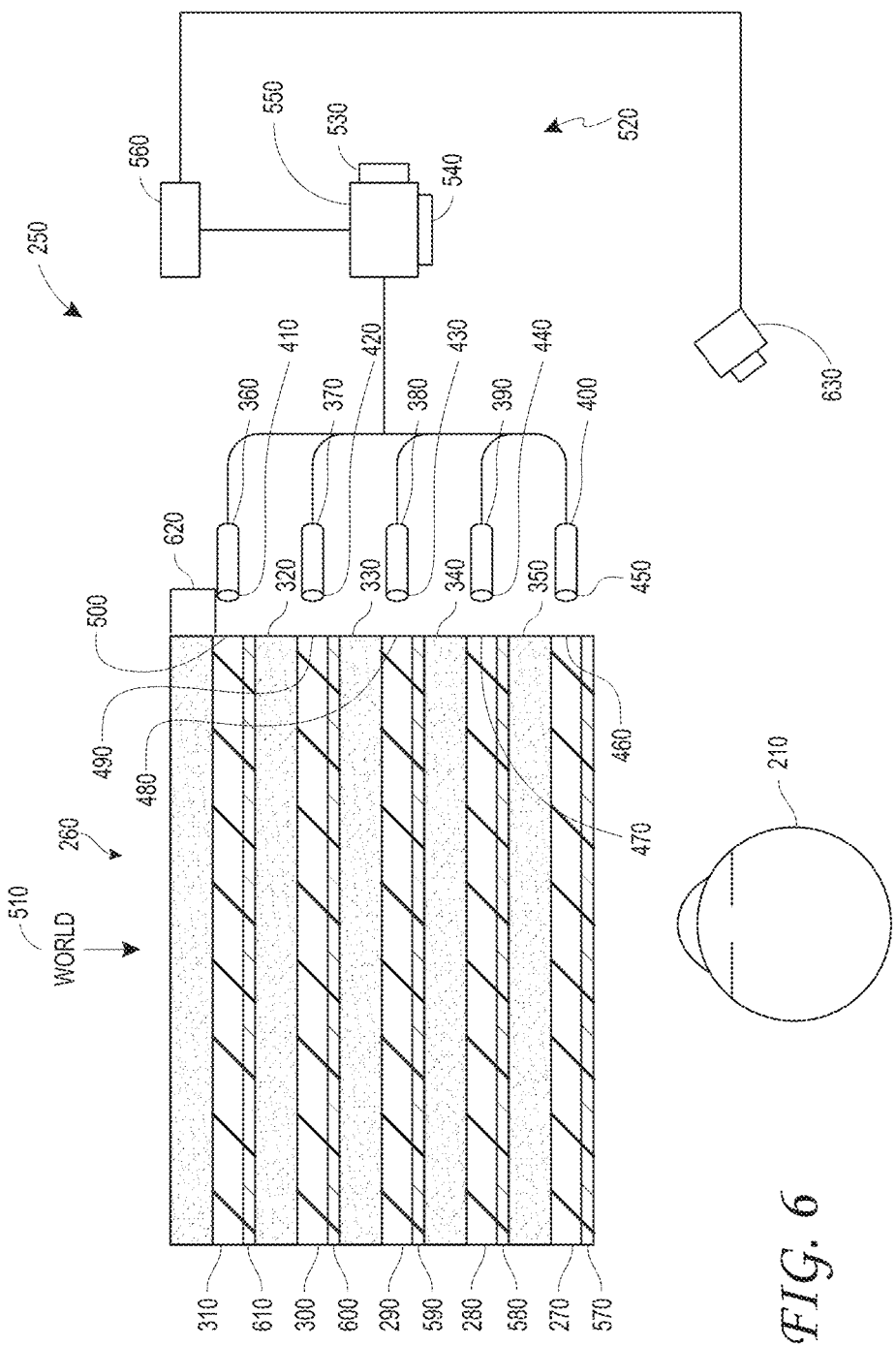
FIG. 6 illustrates an example of a waveguide stack for outputting image information to a user.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250. FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
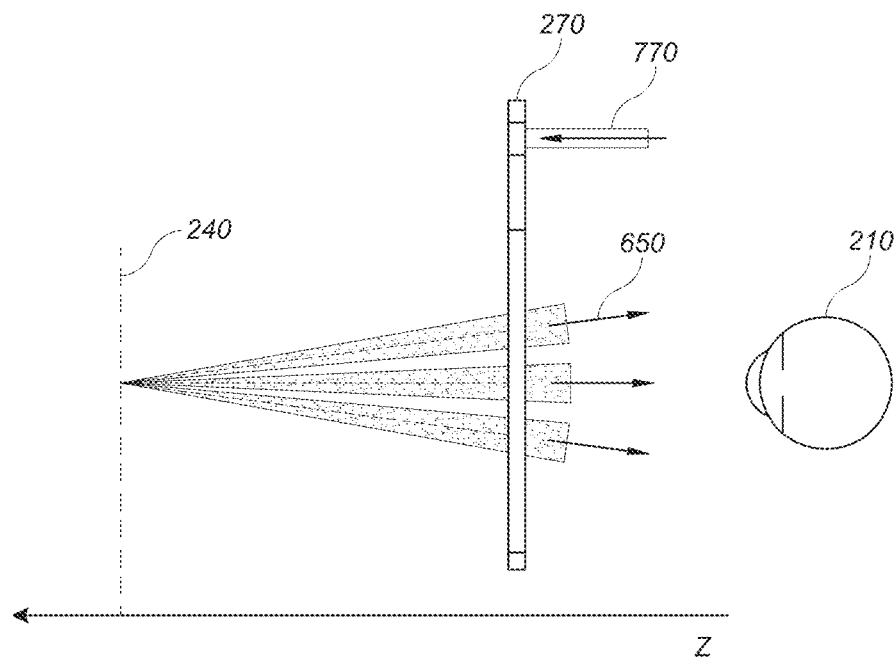
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface. One or more waveguides of the stack may comprise a reflective diffractive optical element comprising a reflective layer comprising, consisting essentially of, or consisting of pure or substantially pure metal as described herein.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for case of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
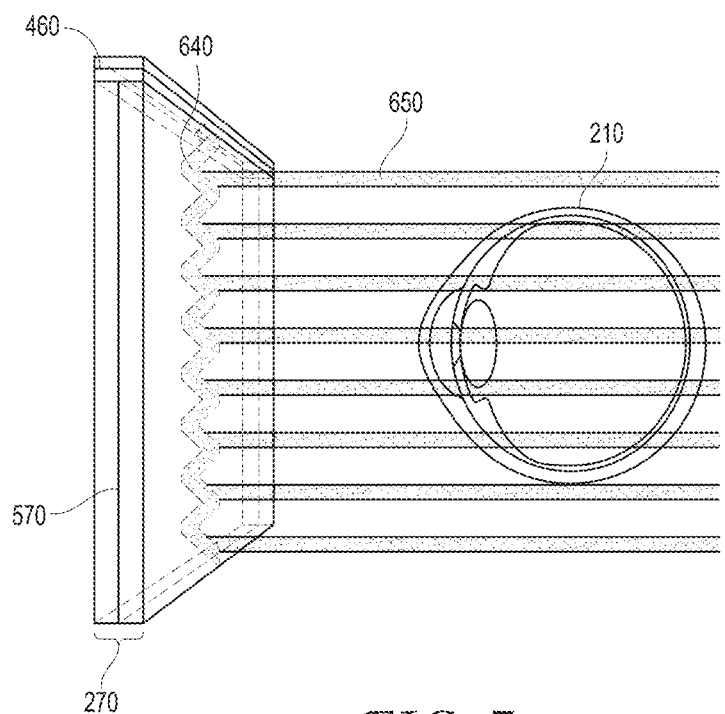
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
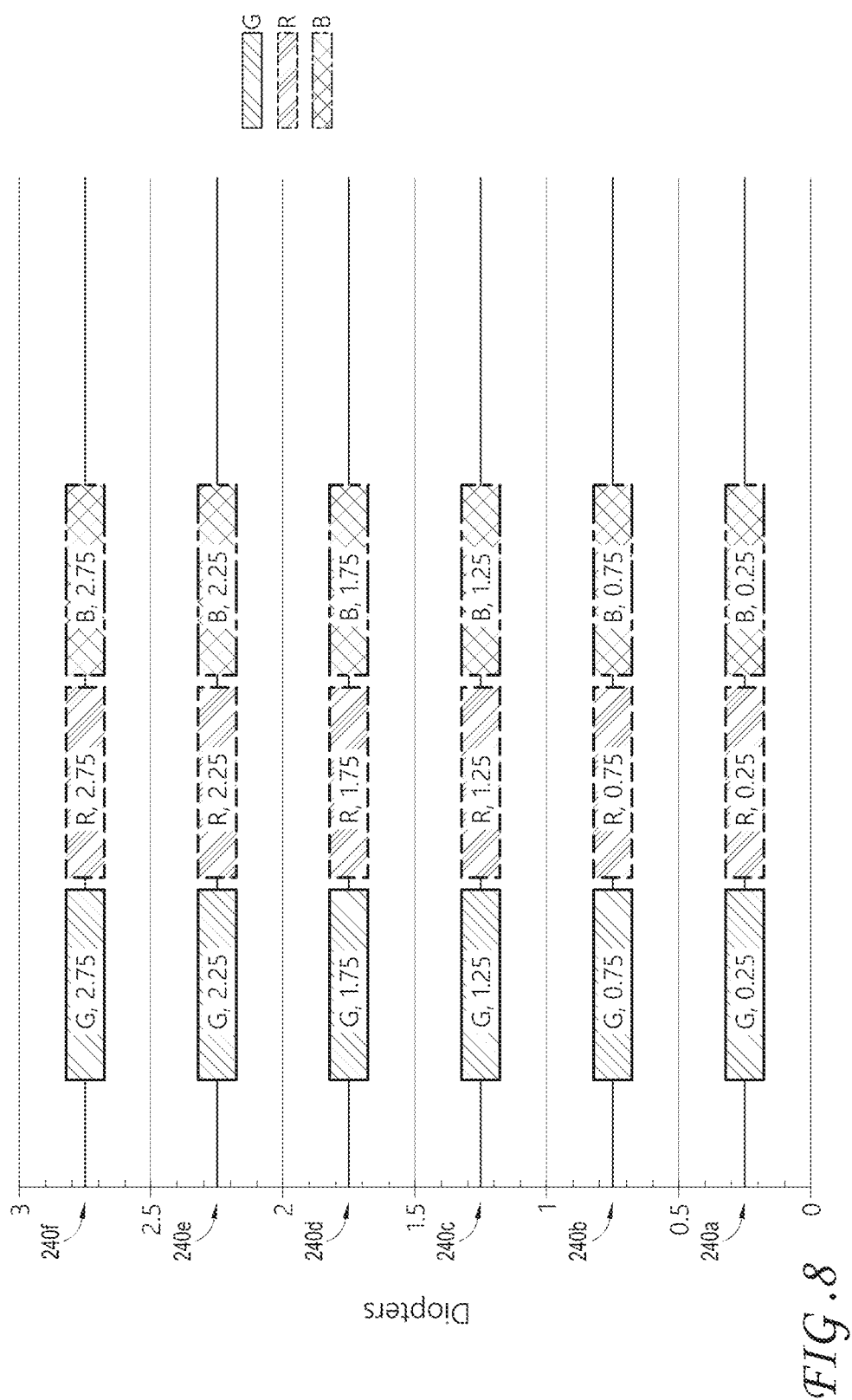
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G. R. and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications. In some embodiments, the in-coupling optical elements and/or other light redirecting structures comprise a reflective diffractive optical element comprising a reflective layer comprising metal deposited by a wet chemistry as described herein. In some embodiments, the reflective layer may be formed of metal consisting essentially of, or consisting of pure or substantially pure metal formed by a wet chemistry as described herein.

Figure 9A:
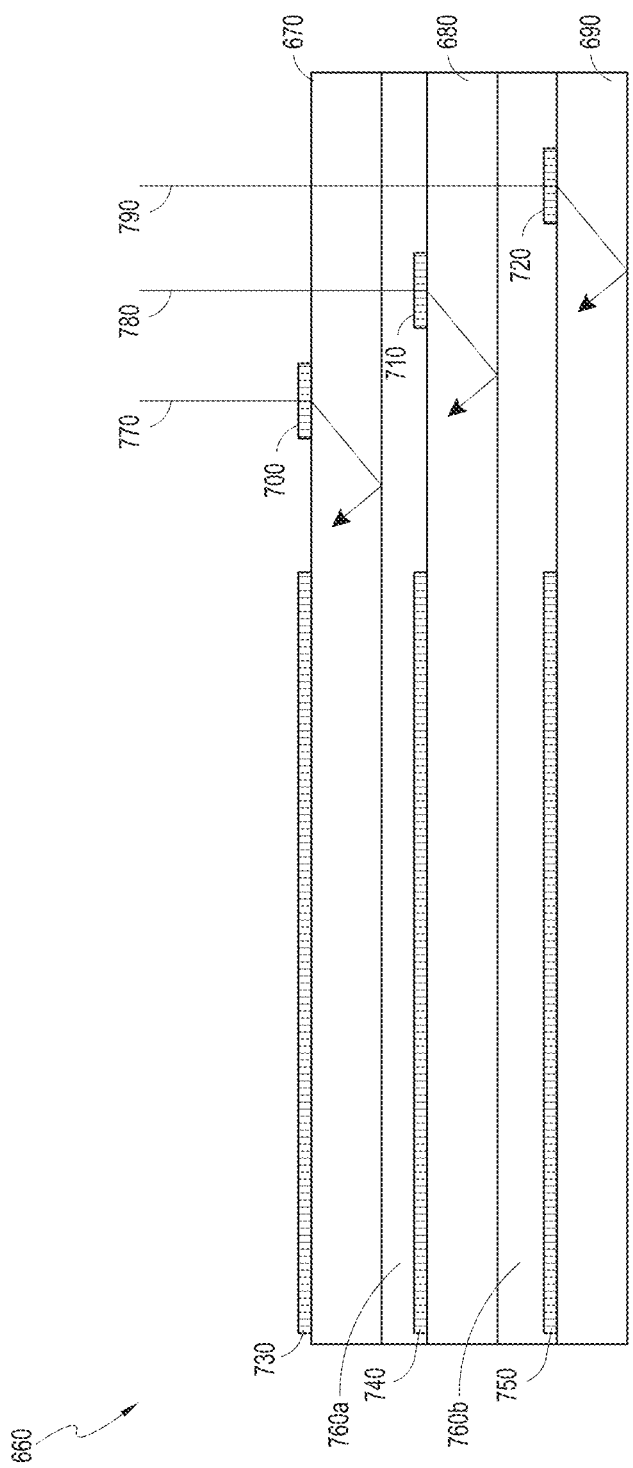
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments. In some embodiments, the in-coupling optical elements and/or other light redirecting structures comprise a reflective diffractive optical element comprising a reflective layer comprising a metal formed by a wet chemistry as described herein. In some embodiments, the reflective layer may consist essentially of, or consist of pure or substantially pure metal formed by a wet chemistry as described herein.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for case of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a. 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
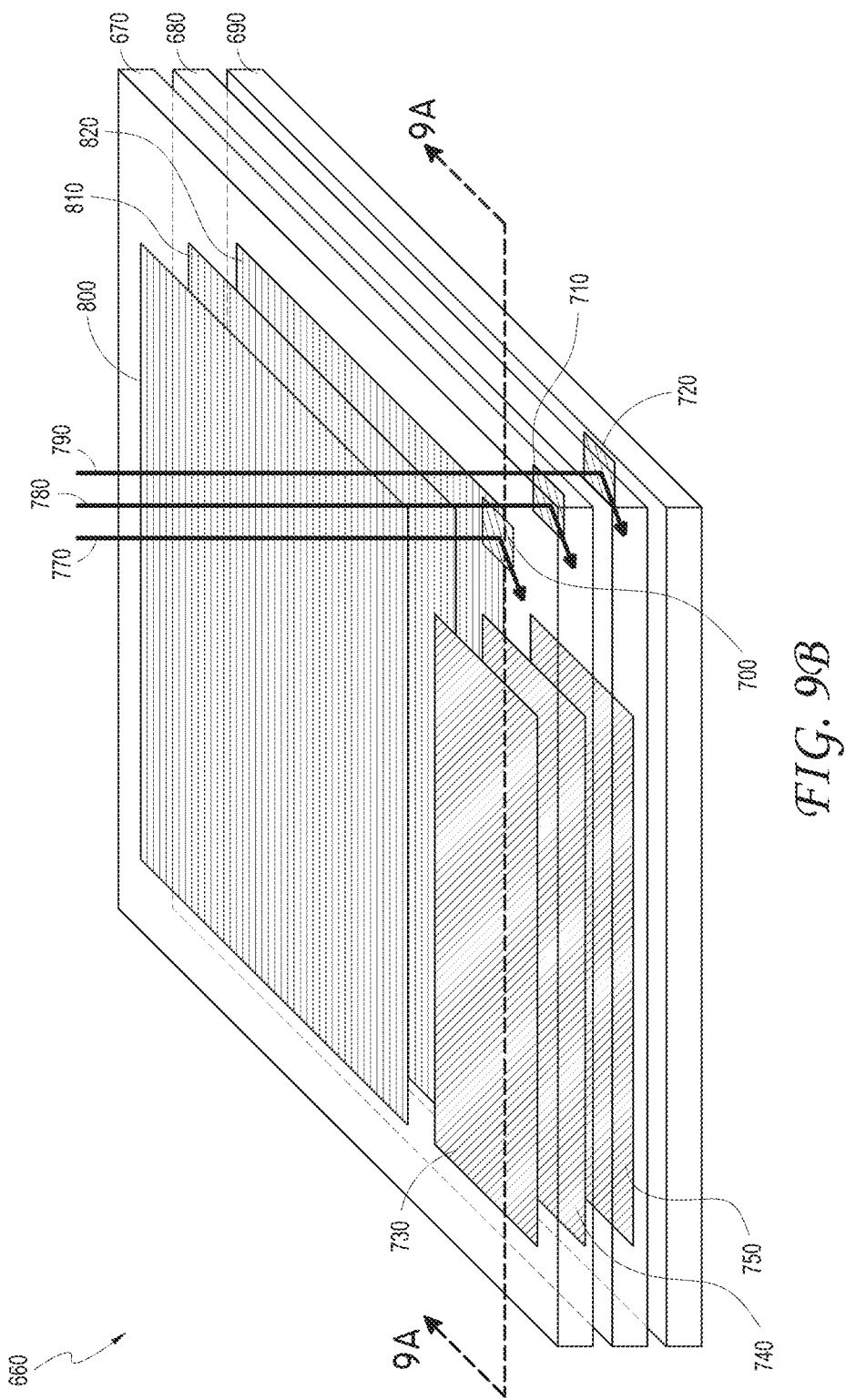
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
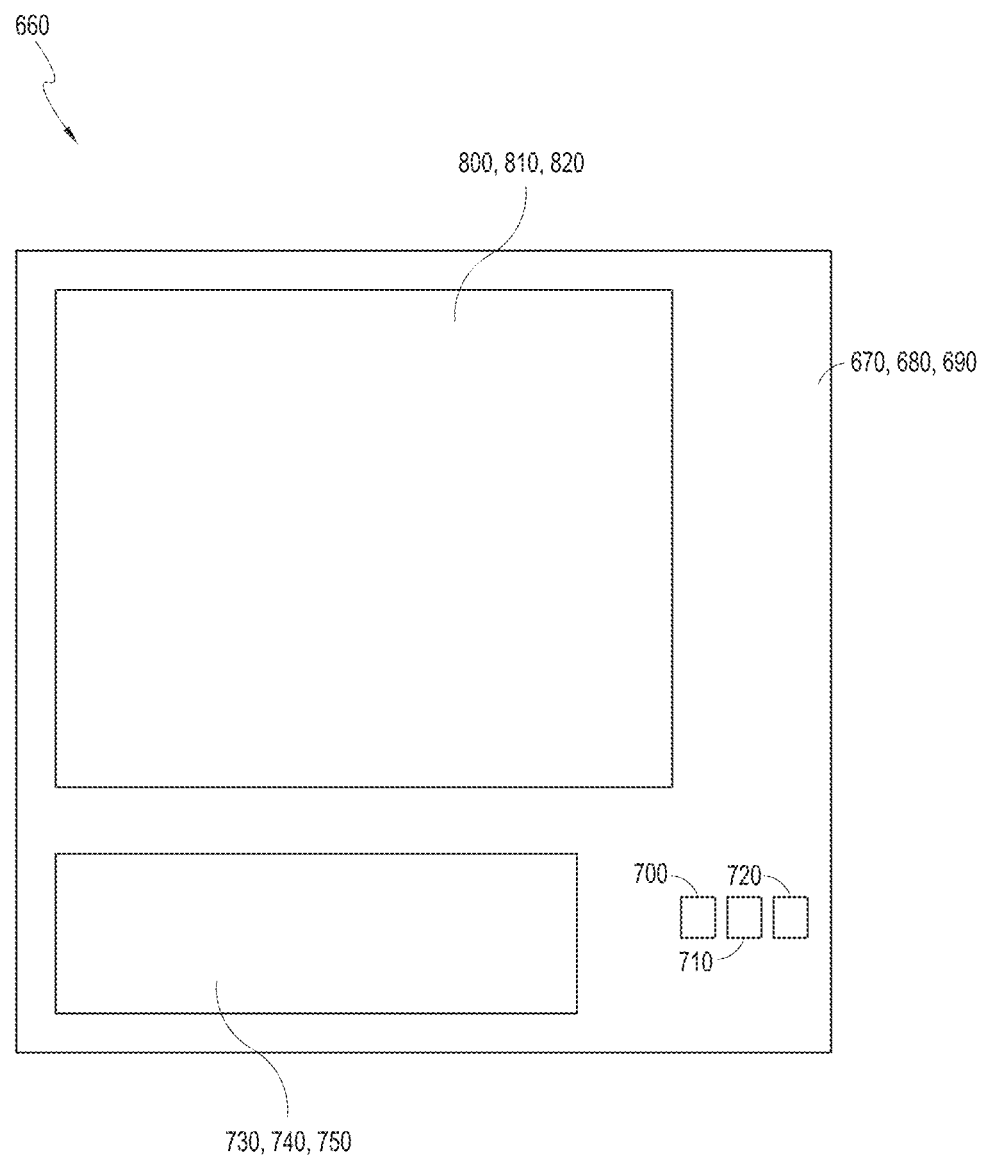
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
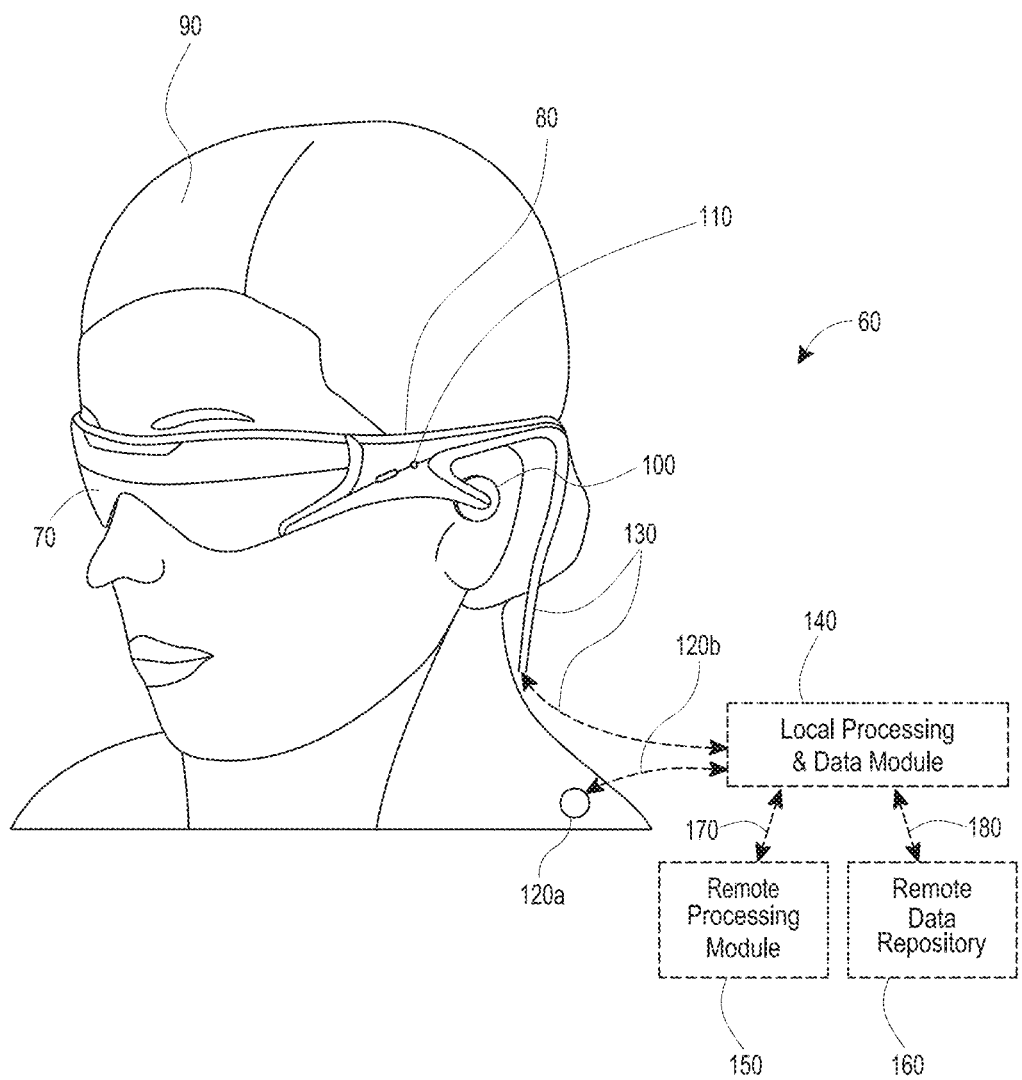
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other car canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Light Projector Systems and Related Structures

Figure 10:
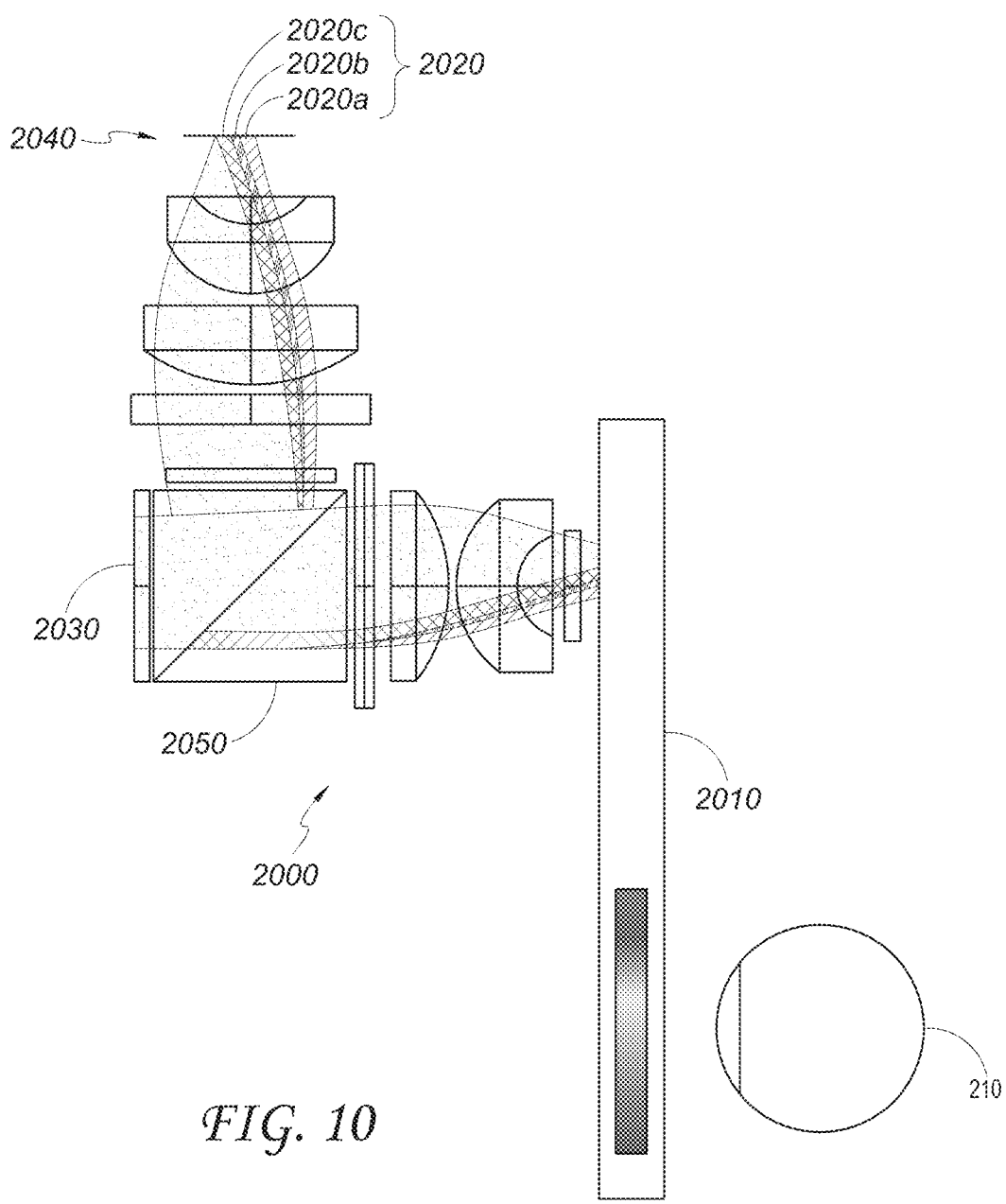
FIG. 10 illustrates an example of a cross-sectional view of a light projector system and a waveguide for directing light to a viewer.

FIG. 10 illustrates an example of a cross-sectional view of a light projector system 2000 and an eyepiece 2010 for directing light to a viewer's eye 210. As discussed herein, multiple light emitters 2020 (e.g., multiple LEDs) may be used to illuminate a spatial light modulator (SLM) 2030. The light emitters 2020 may be part of the light module 2040. In some embodiments, a beam splitter (e.g., a polarizing beam splitter (PBS)) 2050 may be used to reflect light from the light emitters 2020 to the spatial light modulator 2030, which reflects and modulates the light. The modulated light from the SLM 2030 may then propagate through the beam splitter 2050 to the eyepiece 2010, which may include one or more waveguides. In some embodiments, the eyepiece 2010 may correspond to the waveguide stack 260 (FIG. 6) or 660 (FIG. 9A-9C). The waveguides of the eyepiece 2010 relay or guide and output the light to the viewer's eye 210. In addition, it will be appreciated that the light projector system 2000 may correspond to the light projector system 520 (FIG. 6). As illustrated, light propagating through the projection optics may converge on an area of the eyepiece 2010. As also illustrated, due to this convergence, the light is also incident the convergence area at different angles.

The light module 2040 may include a plurality of light emitters 2020 that emit light of different ranges of wavelengths, corresponding to different colors. Different sets of the plurality of light emitters 2020 (e.g., light emitters 2020a, 2020b, 2020c) may emit light of different ranges of wavelengths, with a set of light emitters including one or more light emitters 2020. In some embodiments, the total number of sets of light emitters 2020 may correspond to the total number of component colors used by the display system to form a full color image.

The perception of a full color image by a viewer may be achieved with time division multiplexing in some embodiments. For example, different light emitters 2020 may be activated at different times to generate different component color images. In such embodiments, the component color images that form a single full color image may be displayed sufficiently quickly that the human visual system does not perceive the component color images as being displayed at different times. For example, the rate at which the component color images are sequentially displayed may be higher than the perception persistence of the human visual system. In some embodiments, the different component color images are sequentially displayed at a rate higher than 60 Hz. It will be appreciated that time division multiplexing may advantageously reduce the computational load on processors (e.g., graphics processors) utilized to form a displayed images. In some embodiments, where sufficient computational power is available, all component color images that form a full color image may be displayed simultaneously.

With continued reference to FIG. 10, the different color light emitters 2020 (e.g., red, green and blue LEDs) may be located at different locations and used to illuminate the SLM 2030 and then are imaged back through the beam splitter 2050 onto the eyepiece 2010. In some embodiments, the SLM 2030 may be based on micro-electro-mechanical technology (MEMs) or liquid crystal technology or other switching technology. Since the optics of the light projector system 2000 approximately images the individual light sources into the eyepiece 2010 in some embodiments, the images of the light emitters are spatially separate on the eyepiece 2010.

As disclosed herein, the eyepiece 2010 may include a plurality of waveguides for each color of a plurality of colors. An individual waveguide may in-couple the desired light from the corresponding light emitter and relay it to the eye by use of diffractive optics (e.g., diffractive gratings) in some embodiments. In addition, diffractive optics may direct the light through a waveguide, and may also couple the light out of the waveguide. The waveguides may have power in the relay to the eye to make the light seem to come from a given depth or distance from the viewer, as discussed herein (see, e.g., FIGS. 6-9C and related discussion).

Example In-Coupling Optical Elements

As described above, after being in-coupled by an in-coupling optical element, light may experience re-bounce, which undesirably may cause light loss due to, e.g., undesired out-coupling or absorption of the light at the in-coupling optical element. Light loss due to re-bounce of in-coupled light may effectively decrease the net efficiency of the in-coupling optical elements.

Figure 11A:
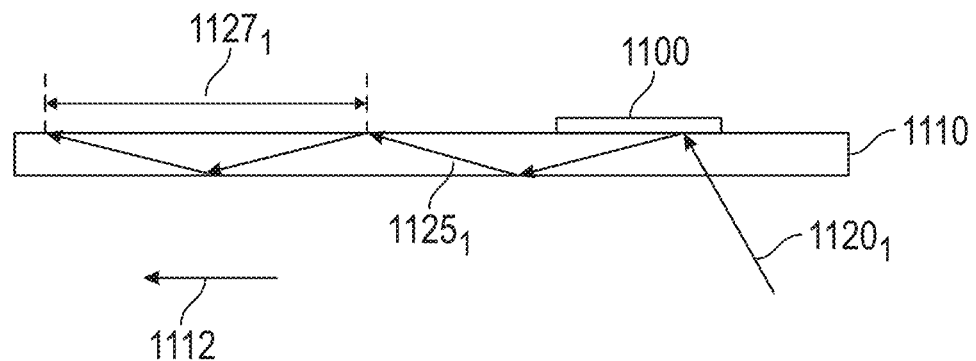
FIGS. 11A and 11B illustrate examples of in-coupling of light into a waveguide at different angles of incidence.
Figure 11B:
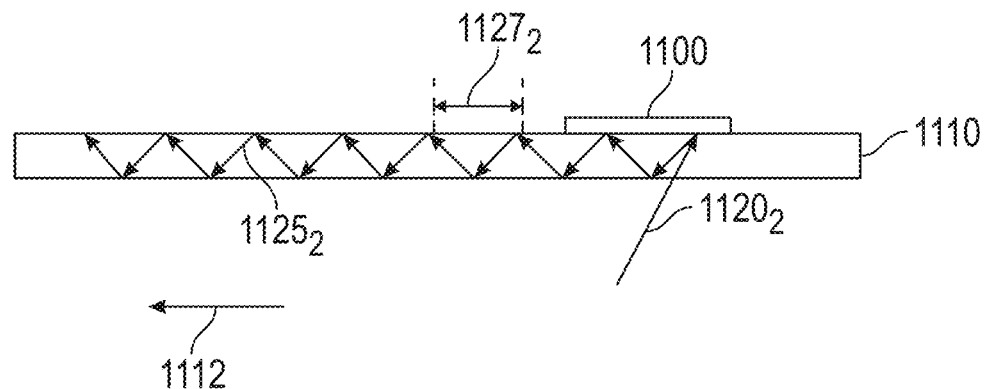

FIGS. 11A and 11B illustrate examples of light being in-coupled into a waveguide 1110 at different angles of incidence at an outer portion (disposed away from the propagation direction of the in-coupled light) of an in-coupling optical element 1100. As noted above, the different incident angles may be due to the convergence of light onto the waveguide 1110 from a light projection system. FIG. 11A depicts the path of an incident beam $1120_1$ incident on the in-coupling optical element 1100 at a generally inward angle (e.g., toward the propagation direction 1112 within the waveguide, also referred to as a "temple" angle). FIG. 11B depicts the path of an incident beam $1120_2$ entering the waveguide at a generally outward (e.g., away from the propagation direction 1112 within the waveguide, also referred to as a "nasal" angle). In operation, a beam of light entering the waveguide 1110 from projection optics may be a conversion or divergent beam including inward angled components and outward angled components; the beam may converge towards a focal point and then diverge. For example, the beam may diverge when the waveguide 1110 is disposed beyond a focal distance of the projection optics, as will be described in greater detail with reference to FIGS. 13A-13C.

FIGS. 11A and 11B each include a waveguide 1110 having a first major surface and a second major surface opposite the first major surface, with the in-coupling optical element 1100 disposed on the second major surface where the in-coupling optical element 1100 is a reflective optical element. Each beam $1120_1$. $1120_2$ enters the waveguide 1110 through the first major surface and is redirected by the in-coupling optical element 1100, such that the in-coupled light propagates within the waveguide 1100 at angles supporting total internal reflection (TIR) and travels generally along the propagation direction 1112 by TIR. In-coupled light is described herein as propagating "along" the propagation direction where its general, aggregate direction of propagation is parallel to the propagation direction. It will be appreciated that this propagation direction may involve multiple bounces of the light off major surfaces of the waveguide 1110; that is, the propagation direction is the net direction of propagation of the light across multiple bounces of that light.

Re-bounce may occur when light is in-coupled at the second major surface of the waveguide 1110, is internally reflected at the first major surface, and is incident on or experiences a second bounce at the in-coupling optical element 1100. As shown in FIG. 11A, a beam $1120_1$ incident upon the in-coupling optical element 1100 at an inward angle typically experiences little to no re-bounce, as the inward angle may result in a relatively large bounce spacing 11271, or distance between any two consecutive reflections at the second major face. In contrast, as shown in FIG. 11B, a beam $1120_2$ incident upon the in-coupling optical element 1100 at an outward angle may have a relatively smaller bounce spacing 11272, and is therefore more likely to experience re-bounce.

Without being limited by theory, it will be appreciated that diffractive optical elements may behave symmetrically; that is, they may redirect incident light such that the incident light propagates through the waveguide at TIR angles. However, light that is incident on the diffractive optical elements at TIR angles (such as upon re-bounce) may also be out-coupled. In addition or alternatively, it will be understood that the reflection of light off of a layer of material such as metal may also involve partial absorption of the incident light, since reflection may involve the absorption and emission of light from a material. Consequently, light out-coupling and/or absorption may undesirably cause loss of in-coupled light and re-bounced light may incur significant losses, as compared with light that interacts only once with the in-coupling optical element.

Figure 12A:
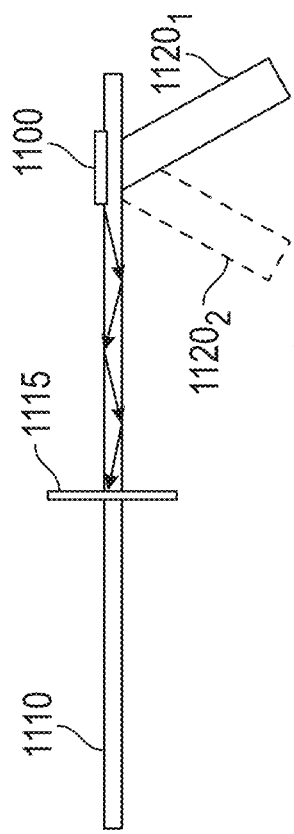
FIGS. 12A and 12B illustrate examples of the effects of re-bouncing of in-coupled light within a waveguide.
Figure 12B:
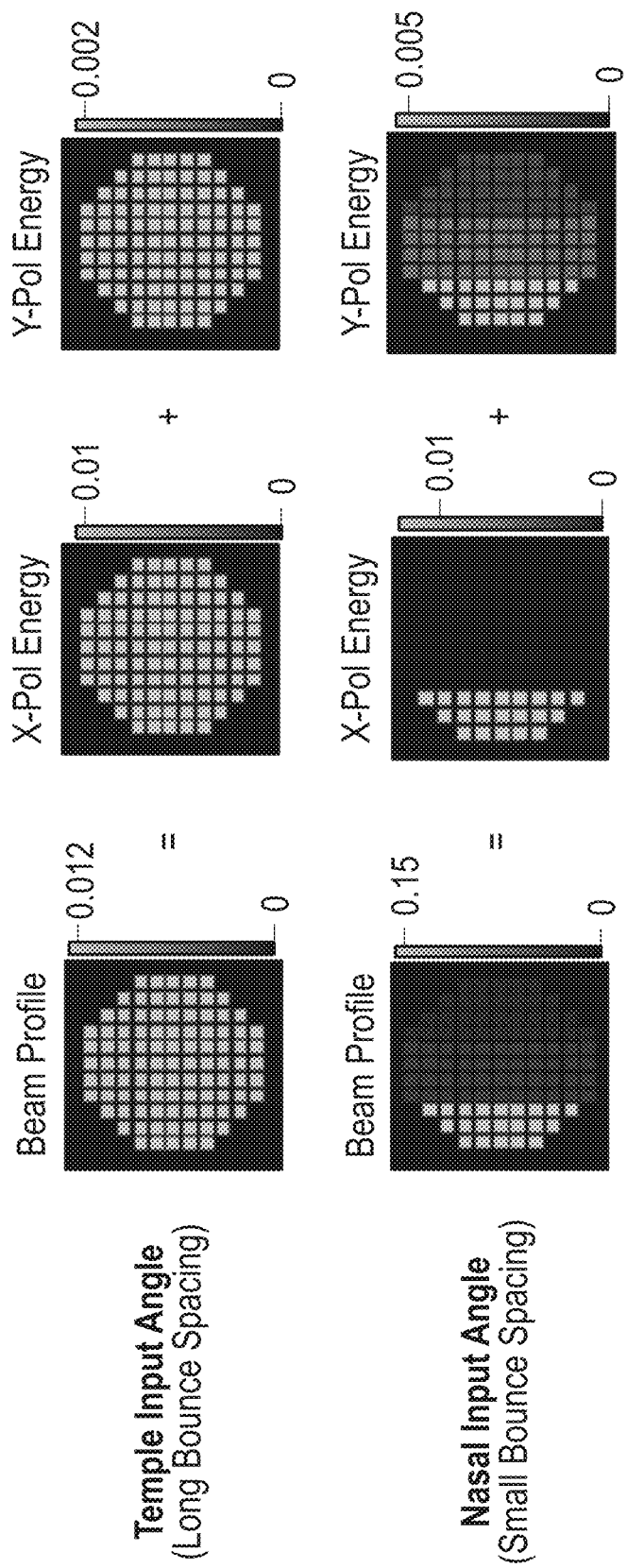

FIGS. 12A and 12B a further illustrate this light loss. FIG. 12B illustrates an example of the energy profile, at a location 1115 along the waveguide 1110, of in-coupled beams within the waveguide 1110 of FIG. 12A. Because the beam $1120_1$ entering at an inward or temple angle is unlikely to experience a substantial amount of re-bounce, effectively resulting in relatively high-efficiency in-coupling and a generally uniform beam profile. In contrast, the beam $1120_2$ entering at an outward or nasal angle is likely to experience a substantial amount of re-bounce, resulting in a loss of light in the waveguide after the initial in-coupling. In addition, as shown in FIG. 12B, the inner or propagation-side portion of the outward angle beam $1120_2$ (e.g., the portion of the beam $1120_2$ closer to the propagation direction 1112) may experience less re-bounce, while the outer portion of the beam $1120_2$ further from the propagation direction 1112 may experience more re-bounce, further resulting in light loss and causing inconsistent net in-coupling efficiency across the beam profile. Where the in-coupled light is used to form an image or part of an image, light loss due to re-bounce may thus irregularly reduce brightness in some portions of the image formed using that light. Moreover, if a display system includes individual waveguides and in-coupling gratings for red, green, and blue light, such reduced efficiency and/or non-uniformity in any of the waveguides may result in a reduced color accuracy, including a reduced ability to reliably produce white light or other colors requiring a combination of red, green, and/or blue light.

Figure 13A:
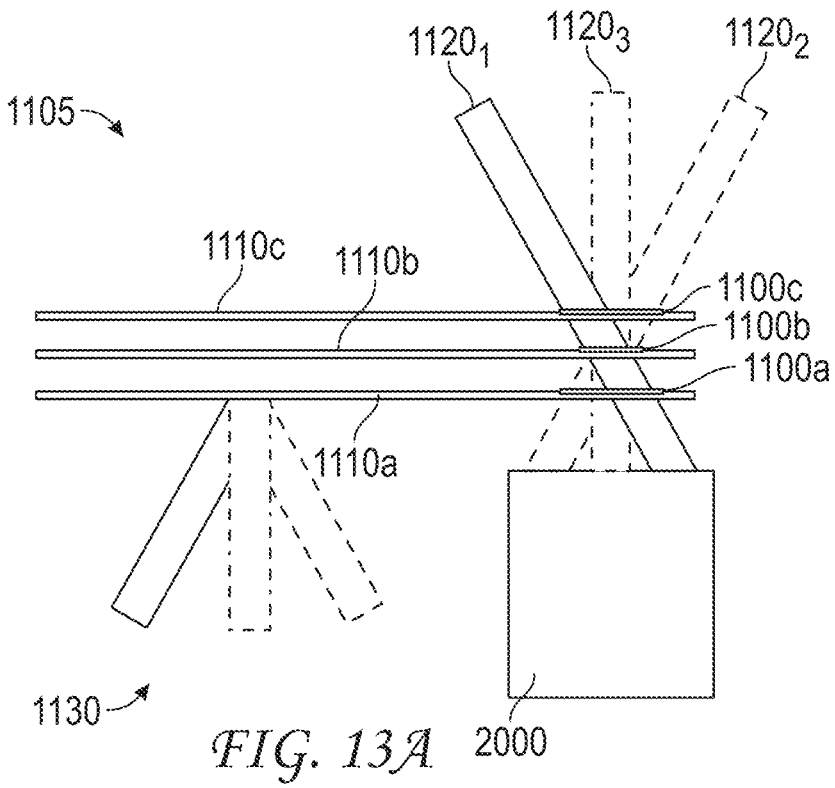
FIGS. 13A-13C depict examples of a waveguide stack and constituent waveguides illustrating the prevalence of re-bounce in waveguides disposed beyond a focal distance of corresponding projection optics.
Figure 13B:
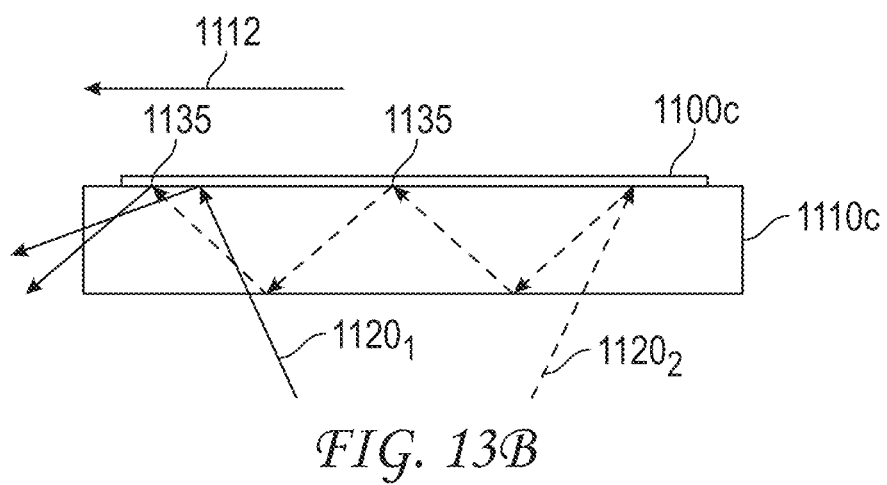
Figure 13C:
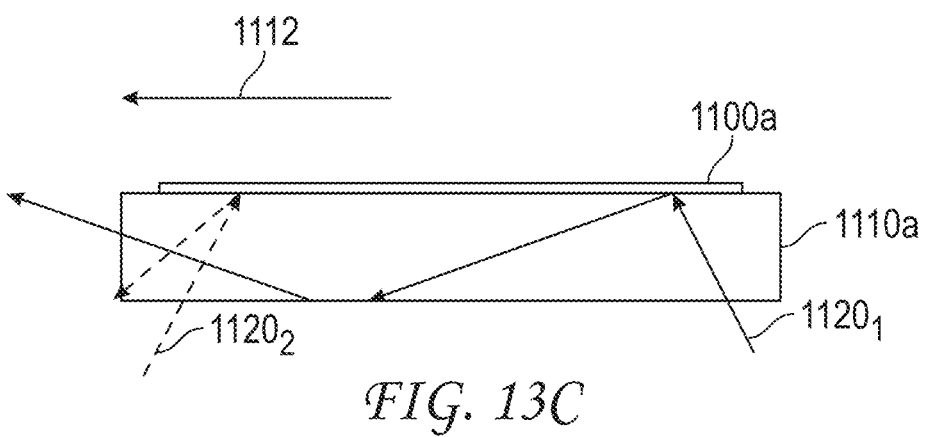

The occurrence of re-bounce may also be dependent, at least in part, on the distance between a waveguide and the source of the incident light. FIGS. 13A-13C depict examples of a waveguide stack 1105 illustrating the prevalence of re-bounce in waveguides disposed beyond a focal distance of corresponding projection optics. As shown in FIG. 13A, the waveguide stack 1105 includes waveguides 1110a, 1110b, and 1110c, disposed at a distance from projection optics 2000. Each waveguide 1110a, 1110b, 1110c includes an in-coupling optical element 100a. 1100b, 1100c, respectively, disposed along the major surface of the waveguide 1110a, 1110b, 1110c farther from the projection optics 2000. In-coupling optical elements 1100a, 1100b, 1100c in-couple the light from the projection optics 2000, which is out-coupled within a wearer's field of view as out-coupled light 1130.

The projection optics 2000 may output a converging beam. In FIG. 13A, the range of angles present within the converging beam are represented by an inward angled beam $1120_1$, an outward angled beam $1120_2$, and a central beam $1120_3$. Waveguide 1110b is disposed at a focal distance of the projection optics 2000, corresponding to the distance from the projection optics 2000 at which beams $1120_1$, $1120_2$. $1120_3$ converge at a focal point. Beyond the focal distance, the light from the projection optics 2000 is a diverging beam. As shown in FIG. 13A, in various embodiments one or more waveguides (e.g., waveguide 1110c) in a waveguide stack 1105 may be disposed beyond the focal distance, while other waveguides in the waveguide stack 1105 may be disposed at the focal distance (e.g., waveguide 1110b) or nearer to the projection optics 2000 (e.g., waveguide 1110a).

FIGS. 13B and 13C are partial enlarged views of the system of FIG. 13A, illustrating the propagation of light from the display optics 2000 in waveguide 1110a (FIG. 13C) and waveguide 1110c (FIG. 13B). As shown in FIG. 13C, re-bounce may not be a substantial concern in waveguides disposed nearer than the focal distance from the projection optics 2000. Because the light from the projection optics 2000 is still a converging beam before reaching the focal point, the outward angled beam $1120_2$ component is incident upon an inner portion of the in-coupling optical element 1100a (e.g., the propagation direction-side portion of the in-coupling optical element 1100a), while the inward angled beam component $1120_1$ component is incident upon an outer portion of the in-coupling optical element 1100a (e.g., the portion of the in-coupling optical element 1100a disposed opposite the propagation direction 1112). Thus, the relatively short bounce spacing of the in-coupled outward angled beam $1120_2$ is still long enough for the in-coupled light to propagate beyond the side of the in-coupling optical element 1100a along the propagation direction 1112 before its second incidence on the second major surface of the waveguide 1100a. In addition, the bounce spacing of the in-coupled inward angled beam $1120_1$ is long enough to avoid any re-bounce of the inward angled beam $1120_1$.

In contrast, as shown in FIG. 13B, re-bounce may be significantly more prevalent in a waveguide 1110c disposed beyond the focal distance of the projection optics 2000. Because the light from the projection optics 2000 is a diverging beam after passing the focal point, the outward angled beam $1120_2$ component is incident upon the outer portion of the in-coupling optical element 1100c, while the inward angled beam component $1120_1$ component is incident upon the inner portion of the in-coupling optical element 1100c. Thus, while the in-coupled inward angled beam $1120_1$ component still experiences little to no re-bounce, the in-coupled outward angled beam $1120_2$ component experiences one or more additional bounces 1135 along the length of the in-coupling optical element 1100c. Because energy may be lost at each subsequent bounce along the length of the in-coupling optical element 1100c, the in-coupled outward angled beam $1120_2$ component may experience significant losses relative to the in-coupled inward angled beam component $1120_1$, resulting in lower efficiency and/or the inconsistent beam profile described above with reference to FIG. 12B. It will be appreciated that while the light of beam component $1120_1$ is illustrated as not undergoing re-bounce for case of description and illustration, the beam component $1120_1$ may undergo re-bounce in some embodiments. However, the number of bounces of the beam component $1120_1$ on the in-coupling optical element will be less than for the $1120_2$. Since light loss is related to the number of bounces, the beam component $1120_1$ will experience less light loss than the beam component $1120_2$.

Figure 14A:
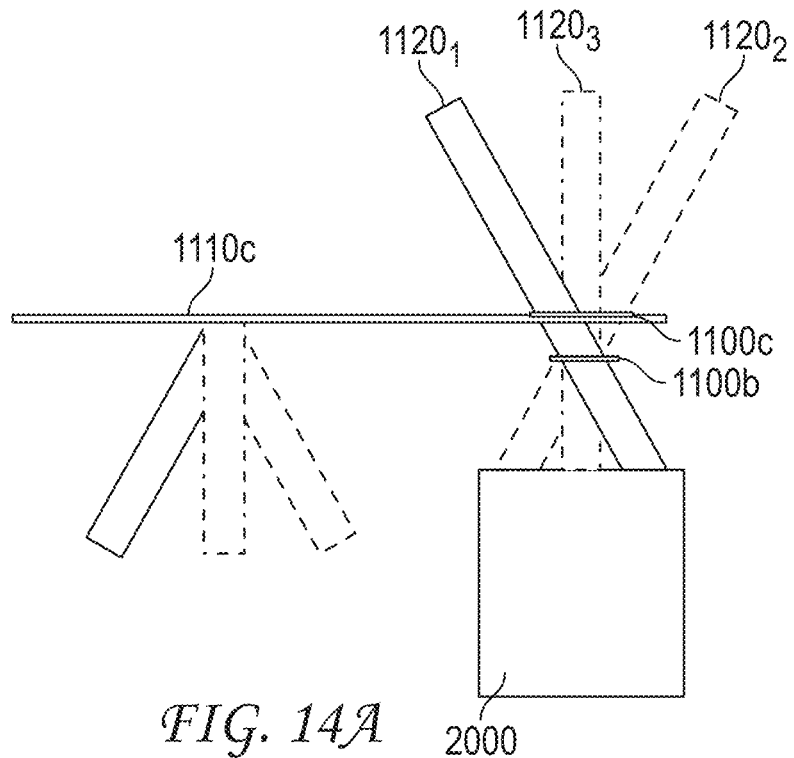
FIGS. 14A-14B illustrate examples of in-coupling optical element truncation in an example waveguide.
Figure 14B:
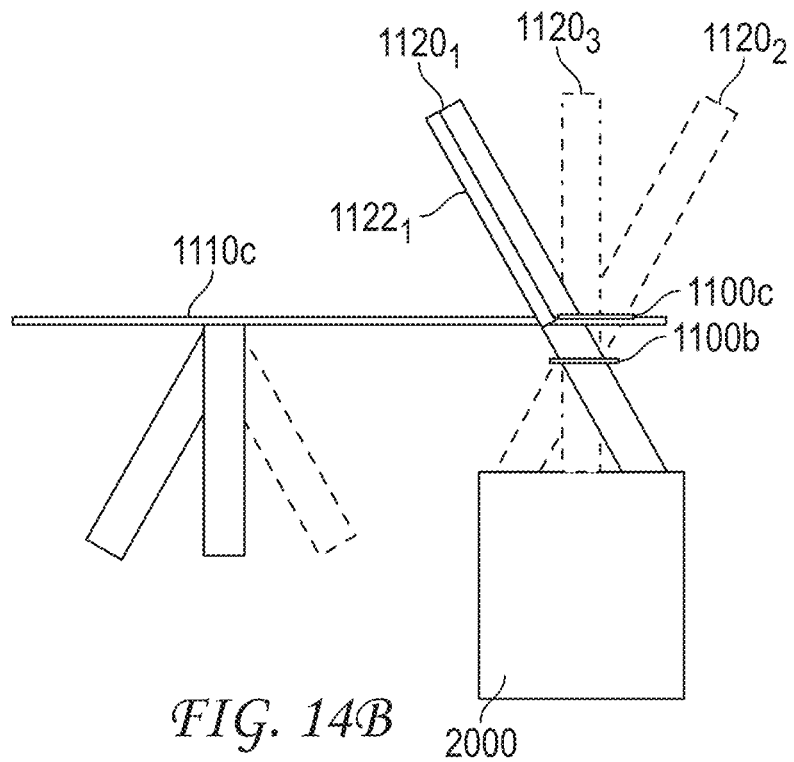

FIGS. 14A and 14B illustrate examples of in-coupling optical element truncation to mitigate the loss of light due to re-bounce in an example waveguide. FIGS. 14A and 14B illustrate a single waveguide 1110c disposed beyond the focal distance of the projection optics 2000. The location of the focal point is indicated by in-coupling optical element 1100b, while waveguides 1110a and 1110b are omitted from FIGS. 14A and 14B for simplicity. The configuration of FIG. 14A is substantially the same as the configuration of waveguide 1110c and in-coupling optical element 1100c in FIG. 13A; FIG. 14B illustrates waveguide 1110c with a truncated in-coupling optical element 1100c.

Specifically, the truncated in-coupling optical element 1100c of FIG. 14B is sized, shaped, and located such that at least an inner portion $1122_1$ of the light from the projection optics 2000 is incident on the waveguide 1110c but not incident on the in-coupling optical element 1100c. In some embodiments, the beam of light from the projection optics 2000 (e.g., as represented by the combination of component beams $1120_1$, $1120_2$, and $1120_3$) may define a light beam area on the second major surface of the waveguide 1110c, and the diffractive region of the in-coupling optical element 1100c may occupy less than all of the light beam area. Generally, the truncated in-coupling optical element 1100c depicted in FIG. 14B is asymmetric about a beam axis running through the center of the central beam $1120_3$ component of the light from the projection optics 2000. For example, the truncated in-coupling optical element 1100c may be radially asymmetric, and/or may be reflectively asymmetric about an axis of symmetry perpendicular to the propagation direction 1112 at the beam axis. In some embodiments, the in-coupling optical element 1100c may terminate at a location such that the inner portion $1122_1$ of the inward angle beam $1120_1$ component passes through the second major surface of the waveguide 1110c without being in-coupled. In some other embodiments, such as embodiments in which the in-coupling optical element 1100c comprises an in-coupling grating with a metalized surface, the inner portion of the in-coupling optical element 1100c may not be metalized, such that in-coupled light re-bouncing at the inner portion will not be absorbed or out-coupled as readily as it would if the inner portion were metalized. Thus, with the truncated in-coupling optical element of 1100c, at least a portion of the inward angled beam $1120_1$ component may not be in-coupled or may be in-coupled at a lower efficiency relative to the remainder of the light from the projection optics 2000. However, the truncation of the in-coupling optical element 1100c also reduces the length along which re-bounce may occur for the in-coupled outward angled beam 1120₂ component. Accordingly, despite incurring a slight loss of certain angles of in-coupled light (that is, a portion of the light from some angles is not in-coupled, as shown in FIG. 14B), the truncated in-coupling optical element 1100c may provide a net increase in in-coupling efficiency since the light that is in-coupled does not experience or experiences less re-bounce-related out-coupling or absorption. Consequently, the amount and uniformity of the in-coupled light may be improved due to the reduction in re-bounce and associated light loss.

Figure 15:
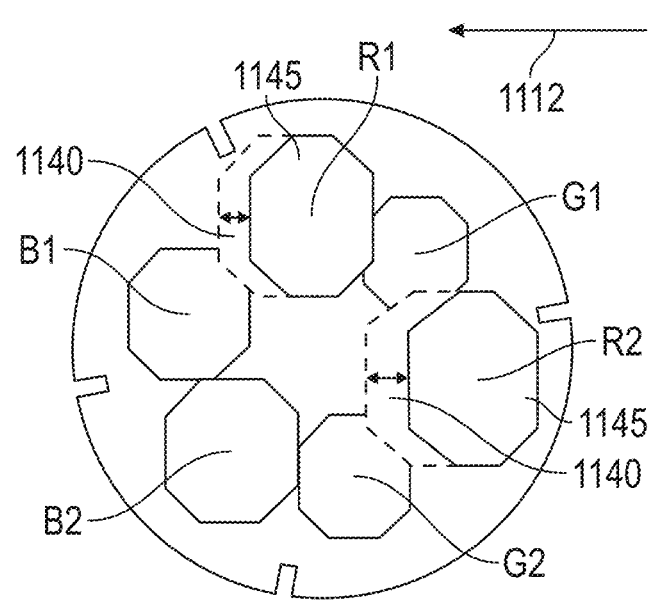
FIG. 15 illustrates a top-down view of an example arrangement of in-coupling optical elements in a waveguide stack.

FIG. 15 illustrates a top-down view of an example arrangement of in-coupling optical elements in a waveguide stack. The configuration of FIG. 15 is viewed in a direction along the central beam 1120₃ of FIG. 13A, perpendicular to the major surfaces of the waveguides, with each in-coupling optical element B1, B2, G1, G2, R1, and R2 configured to in-couple incident light to propagate along propagation direction 1112 within its respective waveguide (not shown). Thus, each in-coupling optical element B1, B2, G1, G2, R1, and R2 has a distinct, associated waveguide. In-coupling optical elements B1, B2, G1, and G2 may be disposed on waveguides located at or nearer than the focal distance of the projection optics, while in-coupling optical elements R1 and R2 are disposed on waveguides located beyond the focal distance of the projection optics. Accordingly, in-coupling optical elements R1 and R2 are truncated to mitigate re-bounce as described above. In some embodiments, truncated regions 1140 of in-coupling optical elements R1 and R2 may comprise open space allowing light incident thereon to pass through the corresponding waveguide without being in-coupled. In other embodiments, optical elements R1 and R2 may comprise a high-efficiency in-coupling region 1145 (e.g., a portion coated with a reflective layer, such as a metallization or metal layer), while the truncated regions 1140 are not metalized so as to reduce losses due to re-bounce occurring within the truncated region 1140.

With continued reference to FIG. 15, as noted herein, each of the in-coupling optical element B1, B2, G1, G2, R1, and R2 are disposed on a different associated waveguide. In some embodiments, light from projection optics may strike these optical elements from above, e.g., normal to the page. Preferably, the optical elements are positioned such that they do not block the propagation of light from the projection optics to each respective optical element. For example, the optical elements are arranged such that the optical elements for waveguides forward of the focal point of the projection optics are laterally spaced apart as seen in a top-down view (from the perspective of the projection optics). Such an arrangement prevents converging beams of light from being blocked. Optical elements of waveguides rearwards of the focal point will receive diverging beams of light. As a result, there may be some small overlap with optical elements that are forward of these waveguides, since the diverging beam of light will expand after passing the forward optical elements and, as such, may not be blocked by the slight overlap with those forward optical elements.

In addition, it will be appreciated that light leakage out of a waveguide and/or the out-coupling of light due to re-bounce may result in leaked or out-coupled light impinging on other in-coupling optical elements. For example, it is possible that re-bounced light out-coupled from the optical element G1 may impinge on optical elements which are "downstream" of the optical element G1 in the propagation direction 1112. For example, leaked or out-coupled light from optical element G1 may impinge on R1 and B1. It will be appreciated that cross talk and image degradation may result if R1 or B1 in-coupled G1's out-coupled light. Advantageously, optical gratings may be configured to be selective for the wavelengths of light that they in-couple, such that R1 and B1 do not in-couple incident light out-coupled from G1. However, G2 may in-couple such light if it were downstream of G1. As a result, preferably, the in-coupling optical elements are arranged such that an optical element for in-coupling light of a particular wavelength is not downstream of an optical element that is configured to in-couple light of similar wavelengths.

In some embodiments, the truncation may be, for example, up to 5%, 10%, 15%, 20%, 25%, 30%, 35%, or more of the full width of the in-coupling optical element. In some embodiments, the nominal (non-truncated) dimensions of an in-coupling optical element may be regular or nearly regular (e.g., the width of the in-coupling optical element parallel to the propagation direction in the waveguide may be in the range of 85%, 90%, 95%, 100%, 105%, etc., of the length the in-coupling optical element perpendicular to the propagation direction). Accordingly, a truncated in-coupling optical element as described herein may have a smaller width, such as 55%, 60%, 65%, 70%, 75%, 80%, etc., of the length of the in-coupling optical element, with the width extending parallel to the propagation direction and the length perpendicular to the propagation direction. In one non-limiting example embodiment, an in-coupling optical element having a length of 1.71 mm and a nominal (non-truncated) width of 1.56 mm may have its width truncated by a distance in the range of 0.1 mm, 0.2 mm, 0.3 mm, 0.4 mm, 0.5 mm, or more. In another non-limiting example embodiment, an in-coupling optical element having a length of 1.83 mm and a nominal (non-truncated) width of 1.63 mm may have its width truncated by a distance in the range of 0.1 mm, 0.2 mm, 0.3 mm, 0.4 mm, 0.5 mm, or more. In each of the examples described above, the truncated portion may be removed entirely, or may comprise a portion of the in-coupling optical element that is not a diffractive region or that is a lower-efficiency diffractive region relative to the non-truncated portion. For example, an in-coupling optical element may comprise a reflecting diffraction grating of the full nominal dimensions, with a metallic coating covering only smaller truncated dimensions of the element, while the truncated portion remains un-metalized; that is, less than the entire area of the diffraction grating may be metallized in some embodiments.

Figure 17:
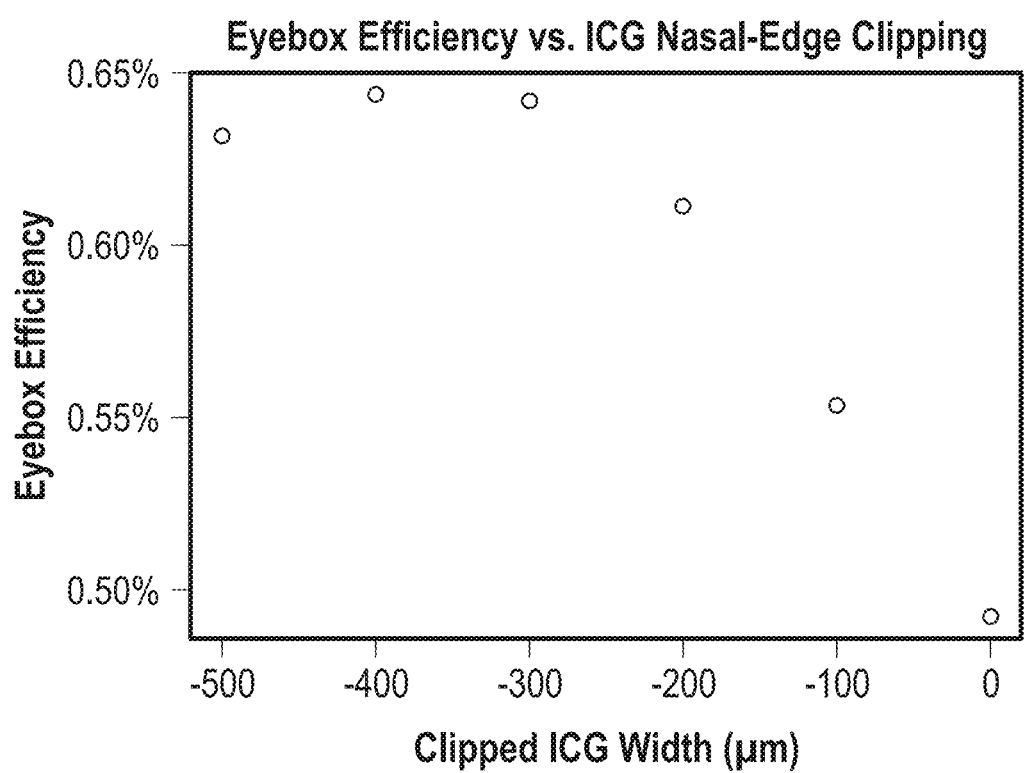

FIGS. 16 and 17 depict experimental results of in-coupling optical element truncation in a configuration similar to FIG. 15, illustrating enhanced effective in-coupling efficiency due to in-coupling optical element truncation. As described above, truncation of the inner portion of an in-coupling optical element beyond the focal distance of the projection optics may result in a net improvement in in-coupling efficiency as the increase in efficiency due to reduced light loss due to re-bounce may outweigh the loss in efficiency due to not in-coupling the innermost portion of the light from the projection optics (or in-coupling the innermost portion at a lower efficiency). Thus, the amount of truncation may be selected so as to provide a desirable balance between mitigation of light loss due to re-bounce and loss of initial in-coupling due to truncation.

Figure 18A:
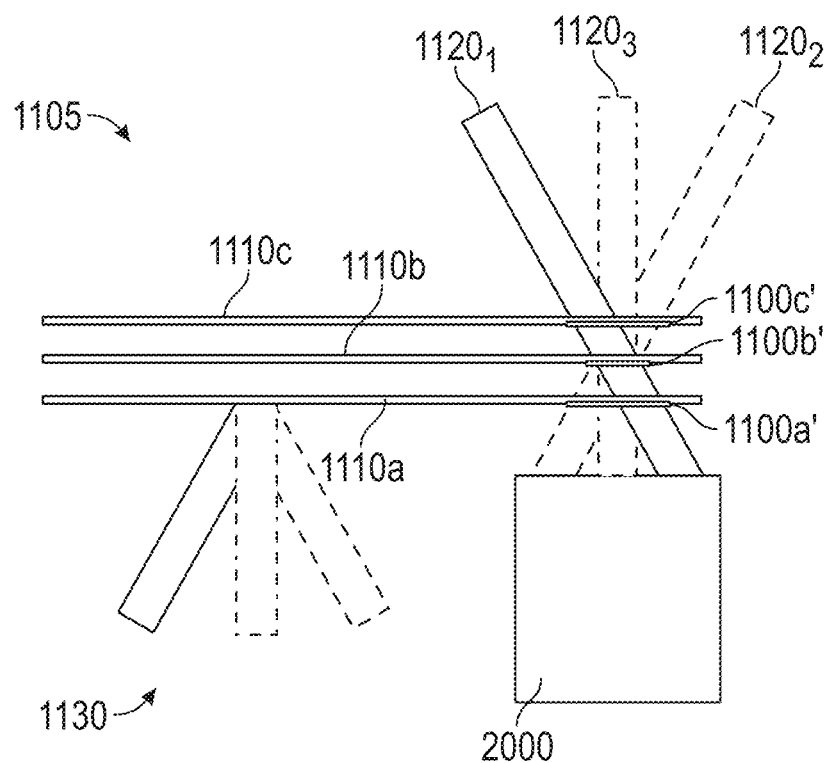
FIGS. 18A and 18B depict examples of a waveguide and a waveguide stack having transmissive in-coupling optical elements.
Figure 18B:
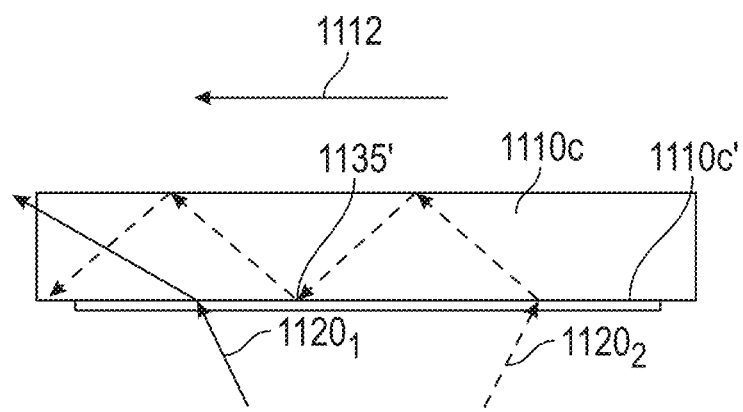

Although the foregoing description and FIGS. 11A-14B generally refer to in-coupling of light with reflective diffractive optical elements, it will be understood that the systems and methods described for mitigation of light loss due to re-bounce may equally be implemented in systems with transmissive diffractive optical elements. As shown in FIGS. 18A and 18B, re-bounce may similarly occur when light is in-coupled by a transmissive diffractive optical element 1100c' disposed at the first major surface of a waveguide 1110c. As shown in FIG. 18B, an outward angled beam 1120₂ redirected into the waveguide 1110c by a transmissive diffractive optical element 1100c' at the first major surface of the waveguide 1110c may be reflected by the second major surface and return to strike the transmissive optical element 1100c' in one or more subsequent re-bounces 1135'. While the transmissive diffractive optical element 1110c' does not have a reflective layer and may not suffer absorption losses caused by absorption by such a reflective layer, the transmissive diffractive optical element 1110c' may have out-coupling losses. Accordingly, light loss due to re-bounce may be mitigated in the system of FIGS. 18A and 18B by truncating the transmissive diffractive optical element 1100c' using any of the techniques disclosed herein, except for techniques using reflective coatings. For example, the truncation may involve providing a high diffraction efficiency region having the dimensions and relative width and length ratios discussed herein and/or having truncation that varies with distance from the focal point of and waveguide from the projection optics 2000, as also discussed herein. In some embodiments, FIG. 15 may be understood to show a top-down view of truncated transmissive diffractive optical elements, which may be understood to include the optical elements R1 and R2.

Example Waveguides and Optical Elements with Reflective Layers

Reflective optical elements may utilize reflective layers to achieve the desired light reflection. Reflective layers may be conventionally deposited using a metallization process that comprises the vapor deposition of a metal layer. These conventional metallization processes may be time-consuming and may comprise a large number of steps. For example, in order to direct the metallization to desired locations on a waveguide, it may be necessary to align and overlie a waveguide with a mask in order to protect areas of the waveguide for which metallization is not desired. The mask, however, may be contaminated by the metallization and may require frequent cleaning. In addition, the vapor deposition itself may require a vacuum, which would further complicate the metallization process and increase its duration by requiring the deposition chamber to be pumped down for the deposition and then brought back up to atmospheric pressure for unloading.

As an alternative to vapor-based metallization processes, metal-containing flowable materials such as reflective inks have been proposed for forming reflective layers. It has been found that some layers formed from reflective inks may have lower reflectivity than desired for some applications and may also have uneven reflectivity across different wavelengths. For example, some metal inks (such as silver inks) may contain organic or inorganic impurities, including impurities such as metal compounds and binders that may inhibit reflectivity. These impurities may reduce optical reflectivity, especially for light of shorter wavelengths, such as light with wavelengths in the blue color region. In addition, some reflective inks have been found to formed layers having uneven thicknesses or pin-holes, which can further adversely impact the reflection of light from theses layers. Reflective diffractive optical elements formed using some metal inks have been found to have poorer diffraction efficiencies than similar diffractive elements formed using reflective layers formed by physical vapor deposition (PVD). Without being limited by theory, it is believed that this poor diffraction efficiency is due to poor reflective properties caused by one or more of the factors noted above.

Advantageously, according to some embodiments, reflective layers and structures incorporating such reflective layers (e.g., reflective diffractive optical elements) are provided with superior reflective properties. Some embodiments include optical devices and display devices having reflective layers, as well as methods of making an optical waveguide structure comprising a reflective layer, and methods of making optical devices. In some embodiments, the reflective layer may be formed on a substrate surface using a wet chemistry. The wet chemistry may include liquid phase reactions to deposit a layer of reflective material on the substrate surface from precursor species in a flowable material such as a liquid mixture. In some embodiments, the deposition may leave a solid state reflective coating on the substrate surface, with the liquid mixture overlying the solid state reflective coating. In some embodiments, the residual liquid mixture may be removed, e.g., by rinsing.

In some embodiments, the wet chemistry may include precipitation of a metal out of the liquid mixture. For example, metal may be part of a metal compound and the precipitate may result from dissociation of a metal from the compound in the liquid mixture. The metal compound may be an ionic compound, such as a metal salt. The ionic compound may dissociate after chemical reaction with another reagent, which may be in the liquid mixture or otherwise provided for contact with the ionic compound. As an example, the chemical reaction may be a metal ion reduction, e.g., silver ion reduction, which results in precipitation of pure or substantially pure metal (e.g., silver) onto a surface of a waveguide. In some embodiments, the metal precipitation may form a reflective layer on a predetermined discrete region of the surface, but not the entire surface; preferably, the precipitate coats a discrete region on the surface of the waveguide. The discrete region of the surface may comprise protrusions, and the reflective layer may deposit conformally on the protrusions to form, e.g., diffractive optical elements.

In some embodiments, the liquid mixture comprises a metal salt (e.g. a silver salt) and a reducing agent reactive with the salt, e.g., at a basic pH. In the reaction, the reducing agent reduces the metal salt, causing metal (e.g., silver) to precipitate and settle onto a substrate surface, to form a reflective layer of the surface of the substrate (e.g., on the surface of a waveguide). Thus, the reflective layer comprises, consists essentially of, or consists of pure metal or substantially pure metal (e.g., pure silver or substantially pure silver).

Advantageously, these reflective layers may exhibit superior optical and physical characteristics. The reflective layers may have high purity, as noted herein. In addition, the reflective layers may be uniform at a nano-scale resolution, so that the reflective layers are free or substantially free of features such as pinholes that may degrade reflectivity. Also, unlike directional depositions such as PVD, the reflective layer may conformally coat the surfaces of protrusions, providing reflectivity on all these surfaces. In addition, the reflective layers may be formed to a thickness to block light and prevent undesired light leakage. Without being limited by theory, it is contemplated that these advantageous characteristics, alone or in combination, may provide reflective layers with greater reflectivity than layers deposited by other methods, such as by PVD or using reflective inks. For example, as described herein, some inks exhibit lower reflectivity than the reflective metal layers formed by ion reduction. In addition to generally being lower, the reflectivity of layers formed using the metal inks is even lower for shorter wavelength light (blue color light) within the visible light range.

Furthermore, in some embodiments, the metal of the reflective layer is stably bound to the surface of the waveguide, so that the reflective layer remains stably adhered to the surface of the waveguide, preferably without a need for adhesives, or binders. In some embodiments, excellent adhesion of the metal is achieved as-deposited; that is, excellent adhesion is provided upon the metal coating the substrate, without need for a post-coating treatment such as an anneal. In some embodiments, the substrate surface treated to facilitate the adhesion of metal species on that surface. As an example, the treatment may include exposing the substrate surface to a plasma. Other example treatments include etching the substrate surface, and forming of an interface layer between the substrate and later-deposited metal.

In some embodiments, reflective layers are formed over protrusions which are diffractive optical elements, e.g., diffractive gratings. The reflective layers and the protrusions together form reflective diffractive optical elements. In some embodiments, the reflective diffractive optical elements are part of a waveguide. For example, the reflective diffractive optical elements may be in-coupling optical elements configured to redirect incident ambient light at angles such that the light propagates through the waveguide by total internal reflection. In some embodiments, reflective layers as disclosed herein may increase the optical performance of a reflective diffractive optical element by increasing the amount of light redirected (e.g., in-coupled) by that diffractive optical element.

As discussed herein, in some embodiments, the reflective layer may be confined in discrete locations, e.g., at the location of a diffractive optical element or a portion of a diffractive optical element. In some embodiments, this confinement may be achieved using physical structures (e.g., walls or dams) to confine the spread of the flowable material. In some other embodiments, the confinement may be achieved by treatment of desired areas of the substrate surface, such that the metal in the reflective layer preferentially coats or is retained (e.g., after rinsing) in those desired areas. As yet another example, the liquid mixture may be applied to desired areas and may have a composition such that they do not significantly spread away from those areas. It will be appreciated that one or more of these schemes for confining the liquid mixture may be utilized to form a particular reflective layer.

In some embodiments, as noted herein, after coating the substrate with metal from the liquid mixture, residual liquid mixture may be removed. This may be accomplished, e.g., by rinsing the substrate with a liquid.

In some embodiments, a cap layer may be formed on the reflective layer to provide protection, e.g., from chemical species present in the ambient environment.

Flowable Materials

As discussed herein, flowable materials, such as liquid mixtures, may be utilized in various embodiments. The liquid mixtures may comprise a metal salt. In some embodiments, the liquid mixtures may also comprise a reducing agent. Examples of suitable metal salts include silver salts such as $Ag(NH_3)_2$. Suitable reducing agents include carbohydrates comprising an alpha-hydroxy aldehyde and/or an alpha-hydroxy ketone. Examples of such carbohydrate reducing agents include glucose, fructose, or a combination of glucose and fructose.

In some embodiments, the metal salt and the reducing agent of the liquid mixtures are reactants for a Tollens reaction. In some embodiments, the liquid mixtures are in a solution, such as an aqueous solution. It is contemplated that liquid mixtures may have a short shelf life, and as such, in some embodiments, a composition comprising the liquid mixtures may be prepared shortly before use, or at the time of use. Some commercially-available products may also provide suitable reactants for some embodiments, for example, metal solutions sold by Peacock Laboratories the West Chester, PA, and by Transene Co. Inc. of Danvers, MA.

In some embodiments, the liquid mixture may include both the metal salt and reducing agent pre-mixed before depositing the liquid mixture onto a substrate. In some other embodiments, the metal salt and the reducing agent may be applied to a predetermined region of the waveguide separately, and mixed in situ on the predetermined region.

In some embodiments, the liquid mixtures further comprise one or more of a pH modifier, stabilizer, surface activation agent, catalyst, and viscosity adjustment component. In some embodiments, the liquid mixtures include chemical species selected from the group consisting of a metal salt, a reducing agent, solvent (such as water), base, pH modifier, stabilizer, surface activation agent, catalyst, and viscosity adjustment component, including combinations of two or more of the listed items. It will be appreciated that relative concentrations of the chemical species may be adjusted to enhance the purity of the metal in the reflective layer, to inhibit pinholes on the reflective layer, to enhance the reaction rate of the metal salt and the reducing agent, to enhance the stability of the chemical species, to enhance the stability of a coating, etc.

In some embodiments, the chemical species react with each other at a basic pH, so that the reducing agent reduces the metal salt, causing metal to precipitate. Accordingly, the liquid mixture may further comprise a base. In some embodiments, the liquid mixture is at a basic pH, for example a pH greater than 7, or greater than or equal to 7.5, 8, 8.5, 9, 9.5, 10, 10.5, 11, 11.5, 12, 12.5, 13, 13.5, or 13.9, including pH ranges between any two of the listed values, or ranges between any of the listed values and 14, for example, 7-10, 7-12, 7-14, 8-10, 8-12, 8-14, 9-10, 9-12, 9-14, 10-12, 10-14, 11-12, 11-14, or 12-14. In some embodiments, the liquid mixtures consist essentially of, or consist of the metal salt, the reducing agent, and a base.

It will be appreciated that different levels of viscosity of liquid mixtures may offer different advantages. For example, relatively viscous liquid mixtures may be amenable to staying within the region in which they were deposited with little further spreading. On the other hand, relatively thin liquid mixtures may be amendable to forming a relatively thin and uniform reflective layer and may more easily flow between closely-spaced features, but may require physical barriers such as walls or dams to confine the liquid mixtures to a predetermined region of the waveguide surface. In some embodiments, once deposited liquid mixtures have reacted to form a reflective layer, one or more additional layers of liquid mixtures may be applied, so as to sequentially form a reflective layer of desired thickness as described herein.

Reflective Layers

A reflective layer in accordance with some embodiments herein reflects at least one visible wavelength of incident electromagnetic radiation (e.g., light in the visible spectrum). The reflective layer may be formed from a flowable material, for example, a liquid mixture. The reflective layer preferably reflects at least about 30% of at least one visible wavelength of incident electromagnetic radiation, for example at least about 30%, 35%, 40%, 45%, 50%, 55%, 60%, 65%, 70%, 75%, 80%, 85%, 90%, 95%, 98%, 99%, 99.5%, or 99.9% of the incident electromagnetic radiation, including ranges between any two of the listed values, for example about 30%-99%, 30%-95%, 30%-90%, 30%-80%, 30%-70%, 50%-99%, 50%-95%, 50%-90%, 50%-80%, 50%-70%, 70%-99%, 70%-95%, 70%-90%, or 70%-80% of the incident electromagnetic radiation. In some embodiments, the incident electromagnetic radiation comprises light of the visible spectrum. It will be understood that a reactant itself (e.g., a metal salt) may not necessarily possess the indicated reflective properties prior to being reacted as described herein, but that the reflective layer (e.g., the metal layer) formed from the reactants has the indicated reflective properties.

It will be appreciated that the reflective layer may be structurally distinct from reflective layers formed by other means such as vapor deposition or metal-containing inks. For example, in some embodiments, the reflective layer comprises pure or substantially pure metal. "Substantially pure" metal as used herein has its ordinary and customary meaning as would be understood by one of ordinary skill in the art in view of this disclosure. It refers to metal that contains no more than trace amounts of other substances. If additional numerical specificity is of interest, the substantially pure metal can comprise at least 95%, 96%, 97%, 98%, 99%, 99.5%, or 99.9% pure metal (w/w), including ranges between any two of the listed values, for example 95%-97%, 95%-99%, 95%-99.9%, 97%-99%, 97%-99.9%, 98%-99%, and 98%-99.9%. As such, the reflective properties of the substantially pure metal are comparable to those of elemental ("pure") metal. In some embodiments, the substantially pure metal has at least 95%, 96%, 97%, 98%, 99%, 99.5%, or 99.9% of the reflectivity of pure metal, including ranges between any two of the listed values.

In some embodiments, the reflective layer is disposed on a waveguide, and is configured to redirect light propagating through the waveguide, for example as part of a light distributing element. In some embodiments, the reflective layer is disposed on a waveguide, and is configured to direct incident ambient light into the waveguide, for example as part of an in-coupling optical element. In some embodiments, the waveguide is part of a display device, such as an augmented or virtual reality display device.

As used herein, "protrusions," "surface protrusions," and variations of these root terms refer to masses of material that extend upwards on or in a substrate, such as in optical gratings extending from the surface of a waveguide. In some embodiments, the protrusions may be formed by etching a substrate, which may include deposited material (e.g., photoresist deposited on a waveguide) or may be a substantially homogenous structure (e.g., a waveguide). In some embodiments, a reflective layer 1010 is disposed over an optical grating 1020 (See, e.g., FIGS. 19A-19C). In some embodiments, a reflective layer 1010 is disposed over an optical grating 1020 having a blazed configuration (See FIG. 19B). In some embodiments, a reflective layer 1010 is disposed over an optical grating 1020 having a multilevel configuration (see FIG. 19C). In some embodiments, the optical grating comprises photoresist which has been patterned.

It will be appreciated that the reflective layer is preferably utilized to provide reflections of light back into and/or through the waveguide. Consequently, the reflective layer preferably coats all surfaces of the protrusions. In some embodiments, the reflective layer is disposed conformally on the optical grating. It is noted that when a material is disposed "conformally" it will substantially conform to the topology of underlying surface. In some embodiments, the thickness of the reflective layer over the underlying surface (e.g. a straight-line thickness extending from the surface across the layer) varies by no more than about +20%, so that across the entire reflective layer, the thickness is within +20% of a mean, for example within +20%, +15%, +10%, +5%, or +1% of the mean. Preferably, the conformal reflective layer is disposed to be free or to be substantially free of gaps between the reflective layer and the surface of the substrate.

It is also contemplated that non-conformal reflective layers may provide suitable reflectivity at the relevant interface in some embodiments (e.g., without being limited by theory, so long at the surface of the reflective layer at the interface with a waveguide is sufficiently reflective and provides sufficient coverage, an opposite surface that does not face the waveguide may not need to conform to the waveguide). Accordingly, in some embodiments, a reflective layer is disposed non-conformally on a surface.

Preferably, the non-conformal layer is disposed to be free or to be substantially free of gaps between the reflective layer and the surface of the substrate. "Substantially free" of gaps between the reflective layer and the substrate has its ordinary and customary meaning as would be understood by one of ordinary skill in the art in view of this disclosure. It acknowledges that some gaps may be present, but they do not appreciably diminish the reflectivity of the reflective optical element formed by the reflective layer and substrate compared to a reflective layer that is free of gaps. In some embodiments, a reflective layer is disposed substantially free of gaps if at least 90% of the surface area of the reflective layer at the interface of the waveguide surface directly contacts the waveguide surface, for example at least 90%, 95%, 97%, 98%, 99%, or 99.9%. In some embodiments, the ink is deposited to a sufficient thickness to completely or substantially completely fill in the open volumes or gaps between the waveguide protrusions.

It will be appreciated that when metal is deposited by conventional means, for example vapor deposition, or in metal-containing ink, the surface of the metal may be uneven, comprising nano-scale pinholes (See, e.g., Example 1 and FIGS. 22A-F). The pinholes refer to cavities, indentations, or extensions from the surface having nano-scale diameters, for example diameters of less than about 1 mm, for example diameters in the range of about 1 nm-about 1000 nm. Without being limited by theory, it is contemplated that pinholes can inhibit the reflectivity of the reflective layer. Without being limited by theory, it is further contemplated that forming a reflective layer by metal ion reduction as described herein can advantageously minimize or avoid the formation of pinholes. In some embodiments, the reflective layer is free or substantially free of pinholes. "Substantially free" of pinholes has its ordinary and customary meaning as would be understood by one of ordinary skill in the art in view of this disclosure. It acknowledges that some pinholes may be present, but they do not appreciably diminish the reflectivity of the reflective optical element formed by the reflective layer and substrate compared to a reflective layer that is free of pinholes. In some embodiments, a surface substantially free of pinholes of some embodiments can comprise pinholes on no more than 10%, 9%, 8%, 7%, 6%, 5%, 4%, 3%, 2%, or 1% of the surface, including ranges between any two of the listed values, for example 1-5%, 1-7%, 1-10%, 2-5%, 2-7%, 2-10%, 5-7%, and 5-10%. It is noted that a reflective layer that is "free" of pinholes will also be "substantially free" of pinholes. In some embodiments, the surface of the reflective layer that interfaces with the protrusions on the waveguide is free or substantially free of pinholes.

Advantageously, forming a reflective layer by metal ion reduction as described herein can avoid the presence of particles such as metal particles (other than the metal itself) in the reflective layer. Without being limited by theory, it is contemplated that metal particles may partially scatter the light, and thus, the reflectivity of a particle-containing reflective layer may be lower than that of a particle-free layer. Accordingly, in some embodiments, a reflective layer is free or substantially free of metal particles. "Substantially free" of particles (such as metal particles) has its ordinary and customary meaning as would be understood by one of ordinary skill in the art in view of this disclosure. It acknowledges that particles such as metal particles (other than the metal itself) may be present in trace amounts, but they do not appreciably diminish the reflectivity of the reflective optical element formed by the reflective layer and substrate compared to a reflective layer that is free of such metal particles (other than the metal itself). In some embodiments, a surface substantially free of particles (such as metal particles other than the metal itself) of some embodiments can comprise more than 5%, 4%, 3%, 2%, 1%, 0.5%, 0.1%, or 0.01% metal particles (w/w) including ranges between any two of the listed values, for example 0.1-1%, 0.1-2%, 0.1-5%, 1-2%, 1-5%, 2-5%, or 3-5%.

In some embodiments, a reflective layer of desired thickness is formed. In some embodiments, the reflective layer has a thickness of least about 10 nm, for example, at least about 10 nm, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, or 1000 nm, including thickness ranges between any two of the listed values, for example, thicknesses of about 10 nm to 900 nm, 10 nm to 500 nm, 10 nm to 410 nm, 10 nm to 400 nm, 10 nm to 350 nm, 10 nm to 300 nm, 10 nm to 250 nm, 10 nm to 200 nm, 10 nm to 150, 10 nm to 100 nm, 10 nm to 50 nm, 30 nm to 900 nm, 30 nm to 500 nm, 30 nm to 450 nm, 30 nm to 400 nm, 30 nm to 350 nm, 30 nm to 300 nm, 30 nm to 250 nm, 30 nm to 200 nm, 30 nm to 150, 30 nm to 100 nm, 30 nm to 50 nm, 50 nm to 900 nm, 50 nm to 500 nm, 50 nm to 450 nm, 50 nm to 400 nm, 50 nm to 350 nm, 50 nm to 300 nm, 50 nm to 250 nm, 50 nm to 200 nm, 50 nm to 150, 50 nm to 100 nm, 80 nm to 900 nm, 80 nm to 500 nm, 80 nm to 450 nm, 80 nm to 400 nm, 80 nm to 350 nm, 80 nm to 300 nm, 80 nm to 250 nm, 80 nm to 200 nm, 80 nm to 150, 80 nm to 100 nm, 100 nm to 900 nm, 100 nm to 500 nm, 100 nm to 450 nm, 100 nm to 400 nm, 100 nm to 350 nm, 100 nm to 300 nm, 100 nm to 250 nm, 100 nm to 200 nm, or 100 nm to 150 nm.

In some embodiments, a single layer of a liquid mixture is deposited with a suitable reactant content and viscosity, so as to form the reflective layer of desired thickness upon the metal ion reduction reaction as described herein. In some embodiments, a layer of liquid mixtures is applied, allowed to at least partially react in a first deposition cycle, and at least one subsequent layer of liquid mixtures is applied on top of the first layer in a second deposition cycle. Optionally, byproducts of the reaction can be removed between cycles of depositing layers of liquid mixtures. Cycles of depositing liquid mixtures may be repeated until a reflective layer of desired thickness is achieved. For example, at least two, three, four, five, six, seven, eight, nine, ten, eleven, twelve, thirteen, fourteen, fifteen, sixteen, seventeen, eighteen, nineteen, or twenty cycles of liquid mixture application may be performed (including ranges between any of the two of the listed values) so as to form the reflective layer of desired thickness.

In some embodiments, a reflective layer of desired thickness is formed by confining a suitable quantity of liquid mixtures behind a barrier, dam, or wall as described herein. The barrier, dam, or wall can define at least a portion (or all) of a predetermined region of a surface of a waveguide as described herein.

It will be appreciated that the underlying protrusions may form diffractive optical elements (e.g., a diffractive grating), which may be utilized as in-coupling optical elements to in-couple light into the waveguide in some embodiments. As discussed herein, these protrusions may be metallized by PVD to form reflective diffractive optical elements. In some embodiments, metal may be deposited on the protrusions by a wet chemistry in place of the PVD metallization. For example, the metal may be deposited to directly contact and conformally coat surfaces of the protrusions, thereby forming a reflective layer. It will be appreciated that PVD metallization may not provide a conformal layer, due to the directionality of the path of metal species delivered to a substrate by PVD. Advantageously, replacing PVD metallization with liquid metal reflective layers has been found to provide similar or better levels of optical performance. For example, reflective diffractive optical elements formed using the reflective layers according to embodiments herein have been found to provide similar diffraction efficiencies as otherwise similar or superior diffractive optical elements formed using PVD metallization (See Example 2, Tables 2A-B). In some embodiments, the liquid metal-based diffractive optical elements have diffraction efficiencies of 20%, 30%, or 40% for light incident on the diffractive optical elements at angles normal (perpendicular) to those diffractive optical elements. In some environments, liquid metal-based diffractive optical elements are configured to redirect the incident light such that it propagates through the substrate (e.g., a waveguide) by total internal reflection.

Pretreatment Agents

It is contemplated that pretreating the surface of a waveguide prior to depositing the liquid mixtures can enhance the adhesion and formation of a reflective layer as described herein. It has been observed that for photoresist waveguides, pretreatment can enhance both adhesion and reflectivity of the reflective layer (Example 3). Accordingly, in some embodiments, a waveguide comprising photoresist is pretreated prior to depositing liquid mixtures as described herein. It is further contemplated that selectively pretreating the predetermined region, but not other regions of the surface of the waveguide, can facilitate selective formation of the reflective layer in a desired, predetermined region as described herein.

Without being limited by theory, it is contemplated that pretreatment that increases the hydrophilicity of the waveguide surface (so that the waveguide surface is more hydrophilic than it was before the pretreatment) can enhance the adhesion and reflectivity of the reflective layer. Accordingly, in some embodiments, pretreatment that increases the hydrophilicity of the waveguide surface. It has been observed that pretreating a surface comprising photoresist substantially increases adhesion and reflectivity of the reflective layer as described herein. Accordingly, in some embodiments, a waveguide surface comprises photoresist, the surface is pretreated, for example, with plasma, to increase the hydrophilicity of the surface before depositing the liquid mixtures on the surface.

In some embodiments, the pretreatment comprises, consists essentially of, or consists of applying a pretreatment agent to the surface of the waveguide, for example a predetermined region as described herein. Example pretreatment agents include, but are not limited to, a plasma (which can be applied, for example, by atmospheric pressure plasma jet, "APPJ"), a surfactant, a coating (for example, silica), a wet chemical etch (for example chromic acid), and a catalyst (such as tin or palladium, for example stannous chloride or palladium chloride). In some embodiments, pretreating the surface with plasma comprises an atmospheric plasma treatment, the wet chemical etch agent comprises chromic acid, the coating comprises silica, and/or the catalyst comprises tin or palladium or a combination of these. In some embodiments, the surface of the waveguide comprises photoresist, and the surface is pretreated with the pretreatment agent. In some embodiments, the surface of the waveguide comprises photoresist, and the surface is pretreated with plasma. The plasma treatment may be for a matter of seconds, for example about 10, 9, 8, 7, 6, 5, 3, 2, 1 seconds or less. In some embodiments, the plasma treatment is for about 1 second or less.

Without being limited by theory, it is contemplated that pretreatment that enhances the metal ion reduction reaction may be selectively applied to the predetermined region of the surface of the waveguide (but not other regions) can enhance the selectivity of the formation of the reflective layer on the predetermined region (but not the other regions). Accordingly, in some embodiments, the predetermined region of the surface of the waveguide as described herein is pretreated with a catalyst that enhances the metal ion reduction reaction (and reflective layer formation) as described herein.

Optical Waveguides and Methods of Making the Same

In some embodiments, a method of making an optical waveguide structure comprising a reflective layer is described. The method may comprise providing an optical waveguide comprising a surface. The surface may comprise a predetermined region comprising a pattern of protrusions. For example, the predetermined region may define a nanopattern for the deposition of the reflective layer. The method may comprise depositing liquid mixtures on the predetermined region of the surface. The liquid mixtures may comprise a metal salt and a reducing agent, and be at a basic pH. The method may comprise allowing, in deposited liquid mixtures, the metal salt to be reduced by the reducing agent, and pure or substantially pure metal to precipitate on the predetermined region of the surface. Thus, the reflective layer may be formed on the predetermined region of the optical waveguide structure. The resulting reflective layer may be free or substantially free of pinholes as described herein. In some embodiments, the predetermined region is less than the entire surface of the waveguide. In some embodiments, the reflective layer is conformally-deposited on protrusions in the predetermined region of the surface of the waveguide. In some embodiments, the method further comprises pretreating the predetermined region of the surface of the waveguide to increase the hydrophilicity of the surface as described herein, for example a plasma treatment. The pretreating may be before the liquid mixtures are deposited on the predetermined region of the surface. In some embodiments, the method is an electroless plating and/or electroless deposition method. In some embodiments, the reflective layer does not cover the entire surface of the substrate. In some embodiments, the reflective layer covers all or substantially all of a surface of the substrate. In some embodiments, the method further comprises die cutting or dicing the substrate and reflective layer into many different pieces, so as to form a plurality of reflective optical elements. In some embodiments, the optical waveguide comprising a reflective layer is part of an optical waveguide stack, and the method further comprises attaching one or more other optical waveguides to the optical waveguide so as to form the stack. In some embodiments, the optical waveguide comprising a reflective layer is part of a display device, and as such, the method further comprises disposing the waveguide comprising the reflective layer (or the stack comprising such a waveguide) in a display device. In some embodiments, the predetermined region is defined with a resolution of +50 micron, or an even more precise (numerically smaller) resolution, for example, +40, +30, +20, +10, or +5 microns.

Figure 23:
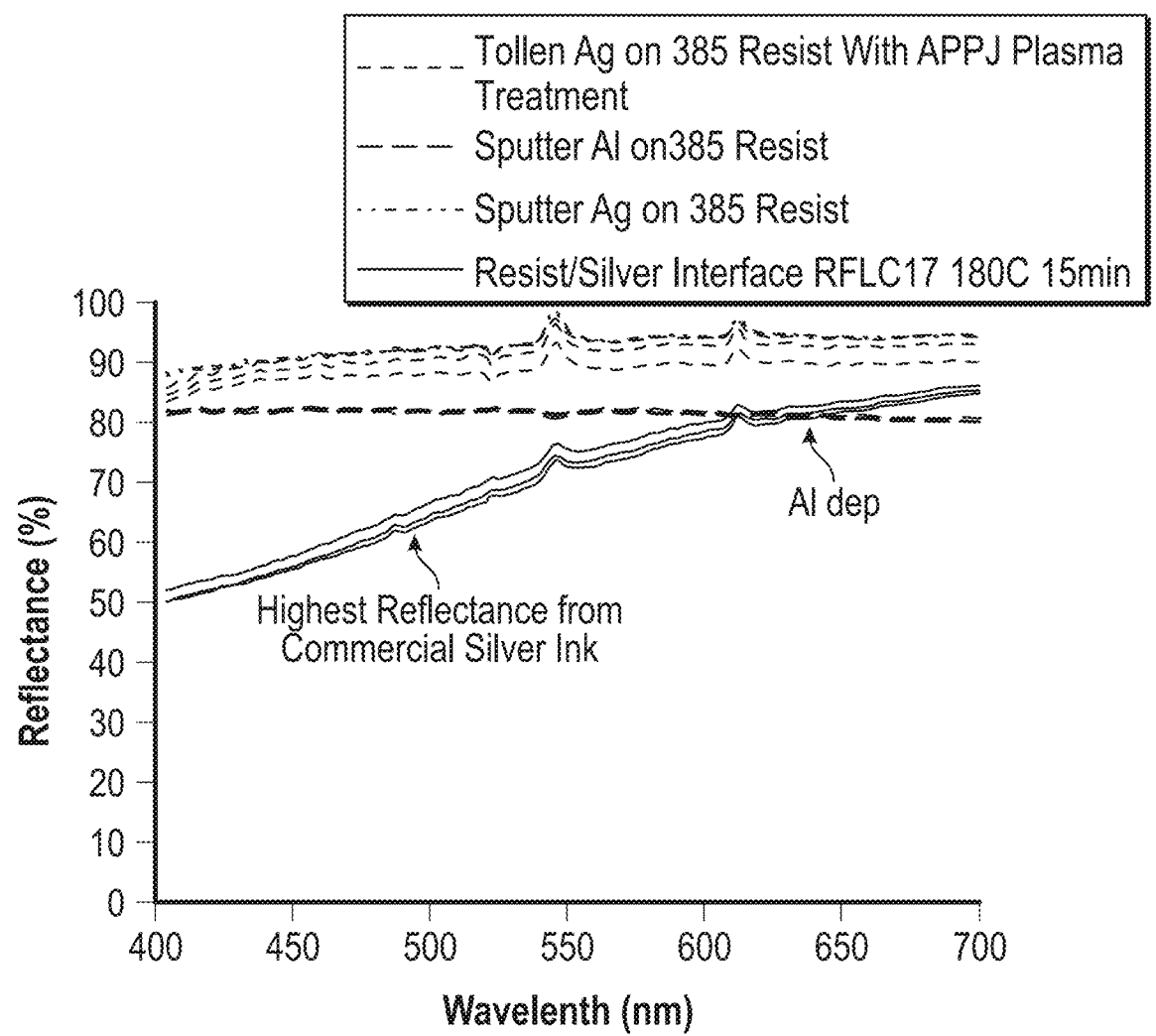
FIG. 23 is a graph showing reflectance (%) of silver layers formed using silver ion reduction, aluminum layers formed by vapor deposition, and reflective layers formed from silver ink.

With reference to FIG. 23, in some embodiments, the method comprises providing an optical waveguide comprising a surface, the surface comprising a predetermined region comprising a pattern of protrusions 1600. The method may further comprise, for example if the surface comprises photoresist, increasing the hydrophilicity of the predetermined region of the surface 1610. For example, the hydrophilicity may be increased by pretreating the predetermined region with plasma as described herein. The method may further comprise depositing liquid mixtures on the predetermined region of the surface, the liquid mixtures comprising a metal salt and a reducing agent at a basic pH 1620. The method may further comprise reducing the metal salt with the reducing agent, so that pure or substantially pure metal precipitates on the predetermined region of the surface 1630. Thus, the reflective layer is formed on the optical waveguide structure 1640. The reflective layer may comprise, consist essentially of, or consist of substantially pure metal (or the reflective layer may comprise, consist essentially of, or consist of pure metal). In some embodiments, the method further comprises removing residue from the reflective layer 150, for example by rinsing and/or drying as described herein.

Advantageously, reflective layers as described herein may be applied selectively to a predetermined region, but not other regions of the surface of the waveguide, for example to form a diffractive optical element, such as an in-coupling optical element as described herein. In some embodiments, the surface of the waveguide, further comprises a first region. The predetermined region, but not the first region, is selectively contacted with the liquid mixtures. Thus, the pure or substantially pure metal precipitates on the predetermined region but not the first region, thus forming the reflective layer on the predetermined region but not the first region of the surface of the optical waveguide. In some embodiments, the liquid mixtures are applied selectively by way of selective plasma pretreatment as described herein that is only on the predetermined region (and not other regions) of the surface. Optionally, the selective plasma pretreatment can be selective by way of a mask overlying the substrate and exposing the predetermined region. In some embodiments, the liquid mixtures are applied selectively by way of a physical structures such as a wall, dam, or well as described herein. The physical structure defines at least a portion of the predetermined region and prevents the liquid mixtures from flowing to other regions of the surface of the waveguide (See, e.g., FIGS. 20A-20B). The walls may be of graded heights, so that inner walls 2002, which define an area for depositing a liquid mixture are lower than outer walls 2004 surrounding the inner walls 2002. Without being limited by theory, it is contemplated that the progression of wall heights can help to prevent defects when filling the region defined by the inner wall by, e.g., consistently confining the location of the deposited liquid mixtures. As such, in some embodiments, the walls serve as dams or molds or wells so as to contain liquid mixtures in a predetermined region of the substrate. In some embodiments, the walls may further serve as spacers to separate waveguides of the stack from each other. In some embodiments, the walls comprise resist. It is contemplated that resist walls can be deposited as a layer that extends across the substrate and then patterned to define the walls in accordance with some embodiments.

The wall, dam, or well may be written on, and/or may be removable. For example, the wall, dam or well may be removed by rinsing with water (or another liquid), peeling off, taping off, and/or vacuuming. In some embodiments, the wall, dam, or well is not removable, but rather is retained as part of a final structure. In some embodiments, the liquid mixtures are applied selectively by way of a mask. One or more openings in the mask can overlay the predetermined region, and the liquid mixtures may be deposited in the one or more openings. The mask may subsequently be removed. In some embodiments, the liquid mixtures are applied selectively with an inkjet. The inkjet may advantageously allow selective application of deposition of the liquid mixture in desired regions.

As described herein, increasing the hydrophobicity of the surface of the substrate may improve adhesion and reflectivity of reflective layers precipitated on the substrate. It is noted that for photoresist surfaces of waveguides, the reflective layer may exhibit substantially greater adhesion and reflectivity when the hydrophobicity of the photoresist has been increased prior to depositing the liquid mixtures (Example 3). As such, pretreatments selectively increasing the hydrophilicity of a predetermined region of the surface of a waveguide (compared to the hydrophilicity of the predetermined region before the pretreatment), but not other regions, can facilitate selective formation of the reflective layer on the predetermined region of the waveguide surface, but not on other regions. In some embodiments, the method comprises increasing the hydrophilicity of the predetermined region of the surface prior to depositing the liquid mixtures. In some embodiments, the hydrophilicity is selectively increased on the predetermined region of the surface, but not a first region of the surface. In some embodiments, the hydrophilicity of the predetermined region of the surface is increased by pretreating the predetermined region of the surface with an pretreatment agent selected from the group consisting of: a plasma, a surfactant, a coating, a wet chemical etch, and a catalyst. In some embodiments, the method comprises pretreating the surface with at least one of: plasma; a wet etch with a wet chemical etch agent comprising chromic acid; a surfactant; a coating comprising silica; and/or a catalyst comprising tin or palladium (such as stannous chloride or palladium chloride). In some embodiments, the predetermined region of the waveguide is not pretreated with any pretreatment reagent.

As described herein, using a catalyst to enhance the metal ion reduction in a predetermined region of the surface of the waveguide (but not other regions) can also enhance selective deposition in the predetermined region. In some embodiments, the method further comprises, prior to depositing the liquid mixtures, selectively applying a catalyst to the predetermined region of the surface. The catalyst can be configured to expedite the reduction of the metal salt, and thereby the precipitation of the pure or substantially pure metal.

Figure 20A:
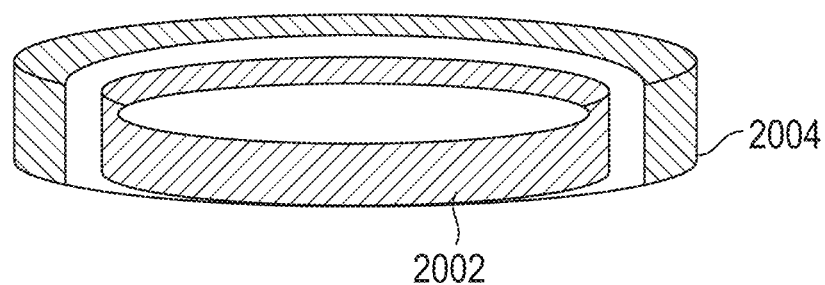
FIG. 20A shows a schematic perspective view of a confined area for forming a reflective layer from reflective flowable material on a pattern of protrusions in accordance with some embodiments.
Figure 20B:
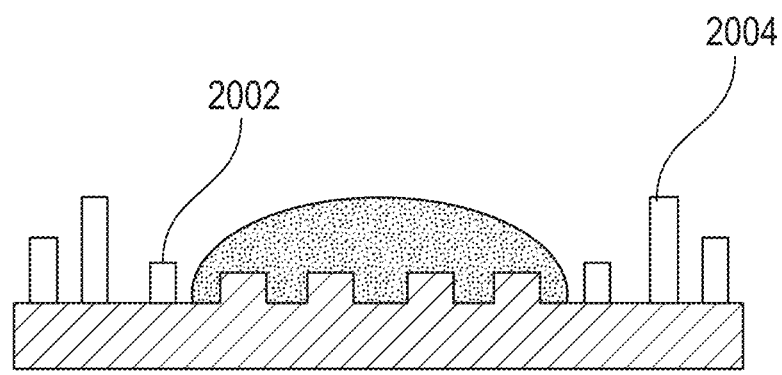
FIG. 20B shows a schematic cross-sectional side view of the confined area of FIG. 20A for forming a reflective layer from reflective flowable material on a pattern of protrusions in accordance with some embodiments.

As described herein, in methods of some embodiments, physical barriers, walls, dams, and/or wells may also enhance selective deposition of the reflective layer by confining the liquid mixtures (and thus precipitated metal) to a predetermined region of the surface of the waveguide. In methods of some embodiments, the surface of the waveguide comprises a vertically-extending wall that defines at least a portion of the predetermined region onto which the liquid mixtures are selectively deposited. The wall restricts lateral movement of the liquid mixtures to the first region. An example of such a wall, well, or dam is illustrated in FIGS. 20A-20B.

In the method of some embodiments, the predetermined region of the waveguide surface comprising the protrusions is part of a grating. At least a portion of the reflective layer may be disposed conformally or non-conformally on the grating. An interface between the reflective layer and the surface may be substantially free of gaps. In some embodiments, at least a portion of the reflective layer is disposed conformally on the grating, and an interface between the reflective layer and the surface is substantially free of gaps. In some embodiments, the reflective layer is disposed conformally on the grating. In some embodiments, at least a portion of the reflective layer is disposed non-conformally on the grating, and an interface between the reflective layer and the surface is substantially free of gaps. In some embodiments, the reflective layer is configured to reflect incident electromagnetic radiation at an interface into the first waveguide.

In the method of some embodiments, the reflective layer on the optical waveguide structure is a diffractive optical element or portion thereof. The optical element may be configured to redirect incident light at angles such that the light propagates through the waveguide by total internal reflection. In the method of some embodiments, the predetermined region of the surface comprises an in-coupling optical element or portion thereof, in which the reflective layer is formed on the in-coupling optical element or portion thereof.

In the method of some embodiments, the waveguide is formed of optically transmissive material and configured to propagate light therein by total internal reflection. In some embodiments, the predetermined surface of the waveguide comprises, consists essentially of, or consists of photoresist.

In the method of some embodiments, an optical waveguide stack comprising the reflective layer is made. The optical waveguide stack may comprise a first waveguide comprising a first surface, and a reflective layer disposed conformally on protrusions of the first surface and adhered to the first surface as described herein. The reflective layer may comprise an interface with the first surface, configured to reflect incident electromagnetic radiation (e.g., light of the visible spectrum) at the interface into the first waveguide as described herein. The optical waveguide stack may comprise at least one other optical waveguide as described herein. In some embodiments, the protrusions of the surface of the first waveguide onto which the reflective layer is disposed form an optical grating, for example a binary grating, a blazed grating, a multilevel grating, an undercut grating, or a metamaterial or metasurface grating, as described herein. In some embodiments, the optical grating comprises patterned photoresist. In some embodiments, after the reflective layer is formed on an optical waveguide structure, the optical waveguide structure is adhered to one or more other optical waveguides, and/or another optical waveguide is deposited on a surface of the optical waveguide (or several cycles of depositing optical waveguides are performed), thus forming the stack of optical waveguides comprising the reflective layer.

The reduction of the metal salt to form the precipitated metal may be referred to herein as a "metal reduction" or "metal ion reduction" reaction. An example of such a reaction is illustrates schematically in FIG. 21C. In the method of some embodiments, a Tollens reaction reduces the metal salt to the pure or substantially pure metal. In some embodiments, the reducing agent comprises consists essentially of, or consists of a carbohydrate comprising an alpha-hydroxy aldehyde, and/or a carbohydrate comprising an alpha-hydroxy ketone. Example reducing agents include sucrose, fructose, and a combination of these. In some embodiments, the metal salt comprises, consists essentially of, or consists of $Ag(NH_3)_2$. In some embodiments, the liquid mixtures consist essentially of the metal salt, the reducing agent, and a base in a solvent, for example water. In some embodiments, the liquid mixtures consist of the metal salt, the reducing agent, and a base in a solvent, for example, water.

In the method of some embodiments, the liquid mixtures are incubated to facilitate reduction of the metal salt. In some embodiments, the incubation occurs at room temperature, for example at about 20, 21, 22, 23, 24, or 25° C., including ranged between any two of the listed values, for example, 20-25° C. In some embodiments the liquid mixtures are incubated slightly below or slightly above room temperature, for example at 15-20° C. or 25-30° C. In some embodiments, the liquid mixtures are incubated at about 15-30° C. For example, the metal ion reduction reaction described in methods of some embodiments herein may be formulated to proceed suitably at room temperature or below. On the other hand, the application of metal inks frequently involves baking/heating at an elevated temperature to generate purer metal, which can impact the thermal budget of the waveguide (and may even damage the waveguide, including damaging resist structures), as well as lengthening the process time. Additionally, high temperature baking may or may not be compatible with the materials used to fabricate the nanostructures such as protrusions on the optical waveguide.

In some embodiments, the liquid mixtures are incubated for at least about 1 second, for example, at least about 1, 5, 10, 20, 30, 40, or 50 seconds, or at least about 1 minute, for example at least about 1, 2, 3, 4, 5, 6, 7, 8, 9, or 10 minutes, including ranges between any two of the listed values, for example 1 second to 1 minute, 1 second to 2 minutes, 1 second to 5 minutes, 10 seconds to 1 minute, 10 seconds to 2 minutes, 10 seconds to 5 minutes, 1-5 minutes, 1-10 minutes, 2-5 minutes, 2-10 minutes, or 5-10 minutes.

In the method of some embodiments, the pure or substantially pure metal is free or substantially free of metal particles other than metal as described herein.

It is contemplated that metal may tarnish and/or degrade, inhibiting its reflective characteristics. Capping the reflective layer may provide protection against tarnishing or other degradation, and thus extending the length of time that the reflective layer retains the desired reflective characteristics (Example 4). In some embodiments, the reflective layer is capped. In some embodiments, the reflective layer is capped with a capping layer that seals the reflective layer, so that the reflective layer is not directly exposed to air and/or moisture. In some embodiments, the capping layer comprises, consists essentially of, or consists of a dielectric or a metal. In some embodiments, the capping is formed by vapor deposition of a dielectric coating or a metal coating on the reflective layer. In some embodiments, the protective layer may be a liquid when applying and may be converted to a solid by chemical reactions or physical status change. In some embodiments, the capping prevents direct exposure of air and/or moisture to the relevant reflective surface of the reflective layer.

It is contemplated that the liquid mixtures of some embodiments may have a short shelf life. Accordingly, in the method of some embodiments, the liquid mixtures are prepared immediately prior to the depositing. In some embodiments, the liquid mixtures are in a single composition. In some embodiments, the liquid mixtures are provided in two or more different compositions. When the different compositions are deposited on the predetermined region of the surface of the waveguide, the liquid mixtures are thus deposited. In some embodiments, two or more different compositions comprising the reactants (collectively) for forming the reflective layer are deposited on the predetermined region simultaneously. For example, for a coating process requiring Part A and Part B to react together, Part A and Part B can be deposited on the predetermined surface at the same time. In some embodiments, two or more different compositions comprising the reactants (collectively) for forming the reflective layer are deposited on the predetermined region sequentially. For example, for a coating process requiring Part A and Part B to react together, a drop or multiple drops of part A can be applied first and then Part B drop(s) can be applied on top. In some embodiments, two or more different compositions comprising the reactants (collectively) for forming the reflective layer are mixed, and then deposited on the predetermined region as a single composition.

A number of suitable techniques can be used for depositing the liquid mixtures on the predetermined region of the waveguide surface in accordance with methods of some embodiments herein. For example, in some embodiments, the liquid mixtures are deposited on the predetermined region via at least one of: nano-dispensing, micro-dispensing, micropipette, inkjet, or spray. In some embodiments, the liquid mixtures are deposited on the predetermined region as a single drop or multiple drops ranging from the picoliter range to the microliter range. In some embodiments, the liquid mixtures are deposited using a single drop dispensing tool.

In some embodiments, after the reflective layer is formed, residues (for example, byproducts of the reaction such as oxidized carbohydrates and ammonia, or excess reactants) are removed from the reflective layer. The method of some embodiments further comprises removing residue of the metal ion reduction reaction. In the method of some embodiments, the reflective layer is rinsed after it is formed. Residues left over after the reaction may be removed by the rinsing. Examples of suitable rinsing techniques include a flushing/spraying system, a liquid bath with circulation and/or agitation, a spine rinse dry system, or a combination of two or more of the listed techniques. In some embodiments, the rinsing is with an aqueous solution, for example water. In some embodiments, the reflective layer is dried, for example to dry-off wet residue, or to dry off the rinse.

It is further contemplated that in some embodiments, (for example, for a diffractive optical element, in-coupling optical element, or out-coupling optical element as described herein), the relevant surface may be at the interface of the reflective layer of the waveguide, and thus not directly exposed to air. Accordingly, in some embodiments, for example if the relevant reflective surface is not exposed to air, the reflective layer is not capped.

Optical Devices

In some embodiments, optical devices are described. The optical device may comprise a first waveguide comprising a first surface. The optical device may comprise a reflective layer disposed on region of the first surface, in which the reflective layer is free or substantially free of pinholes. The layer may comprise, consist essentially of, or consist of pure metal or substantially pure metal. For example, the layer may comprise at least 95% elemental metal. The reflective layer may be configured to reflect incident electromagnetic radiation at an interface into the first waveguide. In the optical device of some embodiments the first waveguide is part of a stack of optical waveguides as described herein. In the optical device of some embodiments, two or more of the optical waveguides of the stack each comprise a reflective layer as described herein.

Figure 19A:
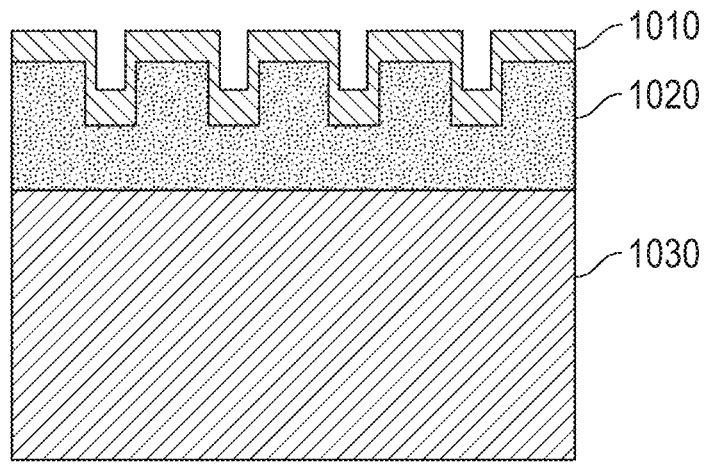
FIG. 19A shows a schematic cross-sectional side view of a reflective layer deposited on a pattern of protrusions in accordance with some embodiments.
Figure 19B:
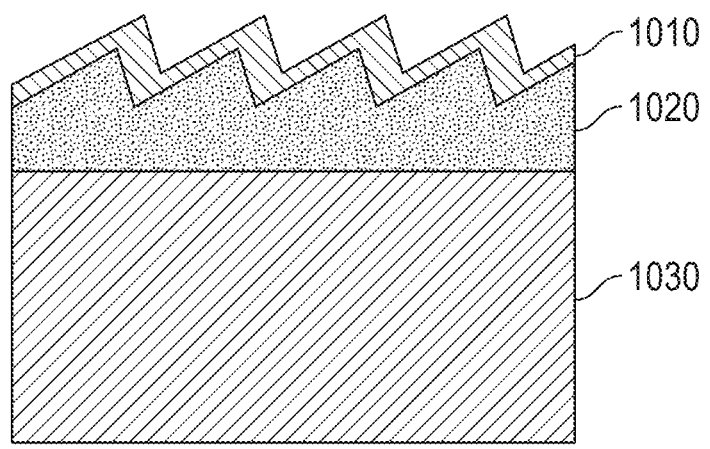
FIG. 19B shows a schematic cross-sectional side view of a reflective layer deposited on a pattern of protrusions in accordance with some other embodiments.
Figure 19C:
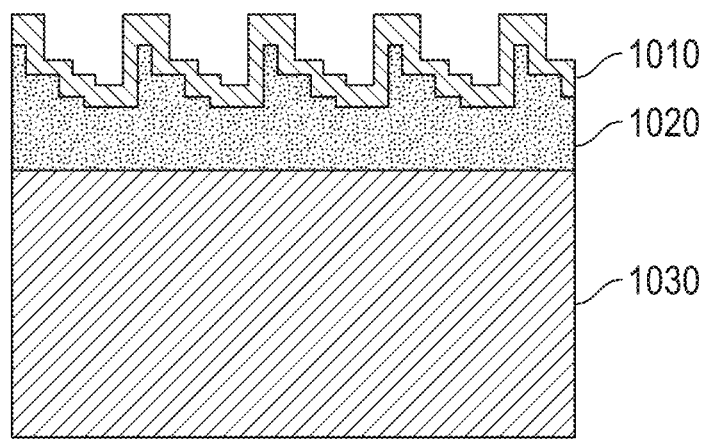
FIG. 19C shows a schematic cross-sectional side view of a reflective layer deposited on a pattern of protrusions in accordance with yet other embodiments.

In the optical device of some embodiments, the region of the first surface comprises protrusions that, together with the reflective layer, are part of a reflective diffractive grating. Examples of protrusions are depicted in FIGS. 19A-19C. In some embodiments, the reflective diffractive grating comprises, consists essentially of, or consists of the reflective layer disposed on the protrusions. In some embodiments, the reflective diffractive grating comprises, consists essentially of, or consists of a portion of the reflective layer disposed on the protrusions.

In the optical device of some embodiments, the reflective layer disposed on the protrusions is part of an in-coupling optical element configured to redirect incident ambient light at angles such that the light propagates through the first waveguide. In one example, light incident on the diffractive grating will be in-coupled to the waveguide such that it propagates away from the diffractive grating at angles suitable for TIR within the waveguide. It will be appreciated that light that is in-coupled may propagate through the waveguide by TIR, reflecting off surfaces of the waveguide at angles similar to the angle at in-coupling. Depending on the geometry of the diffractive grating, or the beam diameter of the light, some of this light may be incident on the diffractive grating during an early reflection of the TIR path, and will undesirably be redirected out of the waveguide. For example, the diffractive grating may be on one surface of the waveguide and incident light may be redirected such that it is in-coupled and reflects off an opposite surface of the waveguide. The reflected light may then be incident on the diffractive grating, which causes the light to be redirected out of the waveguide. In some embodiments, to prevent the undesirable redirection of light out of the waveguide, the diffractive grating on which the reflective layer is deposited may be sized and shaped, or the beam diameter may be adjusted, such that in-coupled light that is reflected off an opposite surface of the waveguide does not strike the diffractive grating.

In the optical device of some embodiments, the reflective layer reflects the incident electromagnetic radiation (e.g., light in the visible spectrum) with a reflectivity (or reflectance) of at least 70%, for example, at least 70%, 75%, 80%, 85%, 90%, 95%, 97%, 99%, 99.9% including ranges between any two of the listed values, for example 70%-90%, 70%-95%, 70%, −99.9% %, 80%-90%, 80%-95%, 80%-99.9%, 85%-90%, 85%-95%, 85%-99.0%, 90%-95%, or 90%-99.9%. In some embodiments, the reflective layer reflects the incident electromagnetic radiation (e.g., light in the visible spectrum) with a reflectivity of at least 85%. The predetermined region of the waveguide surface may be sized and shaped accordingly.

In the optical device of some embodiments, the reflective layer maintains, for at least 500 hours, the ability to reflect the incident electromagnetic radiation with a reflectivity of at least 85%, for example at least 85%, 87%, or 90%. As shown in Example 4 and FIG. 24, reflective layers as described herein can maintain at least about 85% reflectivity (across the 400-700 nm light spectrum), even after 500 hours at 60° C. and 100% humidity, even without capping. Accordingly, in some embodiments, the reflective layer maintains, for at least 500 hours, the ability to reflect the incident electromagnetic radiation with a reflectivity of at least 85%, regardless of whether it is capped.

As described herein, it may be advantageous to confine the reflective layer to a predetermined region of the surface of the waveguide. Accordingly, in some embodiments the first surface comprises a wall that defines a boundary of the reflective layer. The wall may comprise, consist essentially of, or consist of a mechanical spacer configured to maintain space between the first waveguide and an other waveguide.

In some embodiments, the optical device comprise, consists essentially of, or consists of a display system comprising an image projector configured to project light containing image information into the first waveguide. For example, the display system may be a wearable display system, or a component of a wearable display system as described herein.

In the optical device of some embodiments, the reflective layer is free or substantially free of metal particles other than the metal as describe herein.

The optical device of some embodiments may further comprise an interface layer comprising at least one of a surfactant, catalyst, or coating disposed at an interface of the reflective layer and the first surface. As described herein, the surfactant, catalyst, and/or coating may facilitate selective deposition of the reflective layer, and can enhance adhesion and optical performance of the reflective layer. In some embodiments, the optical device of some embodiments further comprises at least one of a surfactant or catalyst disposed at an interface of the reflective layer and the first surface. In some embodiments, the optical device of some embodiments further comprises at least one of a catalyst or coating disposed at an interface of the reflective layer and the first surface. In some embodiments, the optical device of some embodiments further comprises at least one of a surfactant or coating disposed at an interface of the reflective layer and the first surface.

The optical device of some embodiments further comprises a capping layer disposed on the reflective layer, as described herein.

Display Devices

In some embodiments, a display device is provided. The display device may comprise a waveguide comprising a reflective diffractive optical element, in which the diffractive optical element comprises a reflective layer disposed on region of a surface of the waveguide. The reflective layer may be substantially free of pinholes. The reflective layer may comprise, consist essentially of, or consist of pure metal or substantially pure metal. For example, the layer may comprise at least 95% elemental metal. The reflective layer may be configured to reflect incident electromagnetic radiation at an interface into the first waveguide. In some embodiments the first waveguide is part of a stack of optical waveguides as described herein. In some embodiments, two or more of the optical waveguides of the stack each comprise a reflective layer as described herein. In some embodiments, the reflective layer does not cover the entire surface of the waveguide.

In the display device of some embodiments, the reflective diffractive optical element forms an in-coupling grating configured to in-couple incident light into the waveguide as described herein.

In the display device of some embodiments, the waveguide is one of a stack of waveguides, and each of the stack of waveguides comprises an in-coupling grating. In a top-down view, the in-coupling gratings may be laterally offset from one another. For example, with reference to FIG. 9A, in-coupling optical elements 700, 710, 720 may be laterally offset from one another.

In the display device of some embodiments, the reflective layer is free or substantially free of metal particles other than the metal as described herein.

The display device of some embodiments further comprises at least one of a surfactant, catalyst, or coating disposed at an interface of the reflective layer and the surface as described herein. In some embodiments, the display device further comprises at least one of a surfactant or coating disposed at an interface of the reflective layer and the surface as described herein. In some embodiments, the display device further comprises at least one of a catalyst or coating disposed at an interface of the reflective layer and the surface as described herein. In some embodiments, the display device further comprises at least one of a surfactant or catalyst disposed at an interface of the reflective layer and the surface as described herein.

The display device of some embodiments further comprises a capping layer disposed on the reflective layer as described herein. The capping layer may be disposed so that an interface of the reflective layer disposed to direct and/p or propagate electromagnetic radiation is not directly exposed to air and moisture.

In the display device of some embodiments, the reflective layer reflects the incident electromagnetic radiation (e.g., light in the visible spectrum) with a reflectivity (or reflectance) of at least 70%, for example, at least 70%, 75%, 80%, 85%, 90%, 95%, 97%, 99%, 99.9% including ranges between any two of the listed values, for example 70%-90%, 70%-95%, 70%, -99.9% %, 80%-90%, 80%-95%, 80%-99.9%, 85%-90%, 85%-95%, 85%-99.0%, 90%-95%, or 90%-99.9%. In some embodiments, the reflective layer reflects the incident electromagnetic radiation (e.g., light in the visible spectrum) with a reflectivity of at least 85%.

In the display device of some embodiments, the reflective layer maintains, for at least 500 hours, the ability to reflect the incident electromagnetic radiation with a reflectivity of at least 85%, for example at least 85%, 87%, or 90%. In some embodiments, the reflective layer maintains, for at least 500 hours, the ability to reflect the incident electromagnetic radiation with a reflectivity of at least 85%, regardless of whether it is capped.

Methods of Making Display Devices

In some embodiments, methods of making an optical device are described. The method may comprise providing a waveguide comprising a surface. The method may comprise depositing liquid mixtures on a region of the surface. The liquid mixtures may comprise a metal salt. The liquid mixtures may also include a reducing agent at a basic pH. The method may comprise incubating the liquid mixtures on the predetermined region of the surface, so that the metal salt is reduced by the reducing agent, and pure or substantially pure metal precipitates. Thus, the reflective layer is formed on the predetermined region of the surface. The reflective layer on the surface may form forms a reflective diffractive optical element. In some embodiments, the method further comprises pretreating the surface to increase the hydrophilicity of the surface as described herein. The pretreating may be before the liquid mixtures are deposited on the predetermined region of the surface.

In some embodiments, the method further comprise providing image projector, in which the image projector is positioned to output light onto the reflective diffractive optical element.

Example Diffractive Optical Elements

In some embodiments, an in-coupling optical element (e.g., in-coupling optical elements 700, 710, 720) comprises a reflective diffractive optical element comprising a reflective layer comprising, consisting essentially of, or consisting of pure or substantially pure metal as described herein.

Figure 21A:
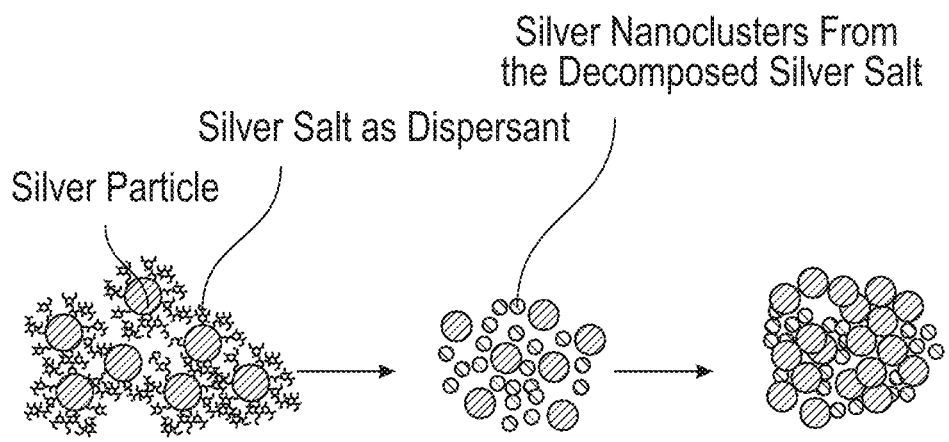
FIG. 21A is a schematic diagram of a "type 1" reaction for forming a silver layer using metal inks.
Figure 21A:
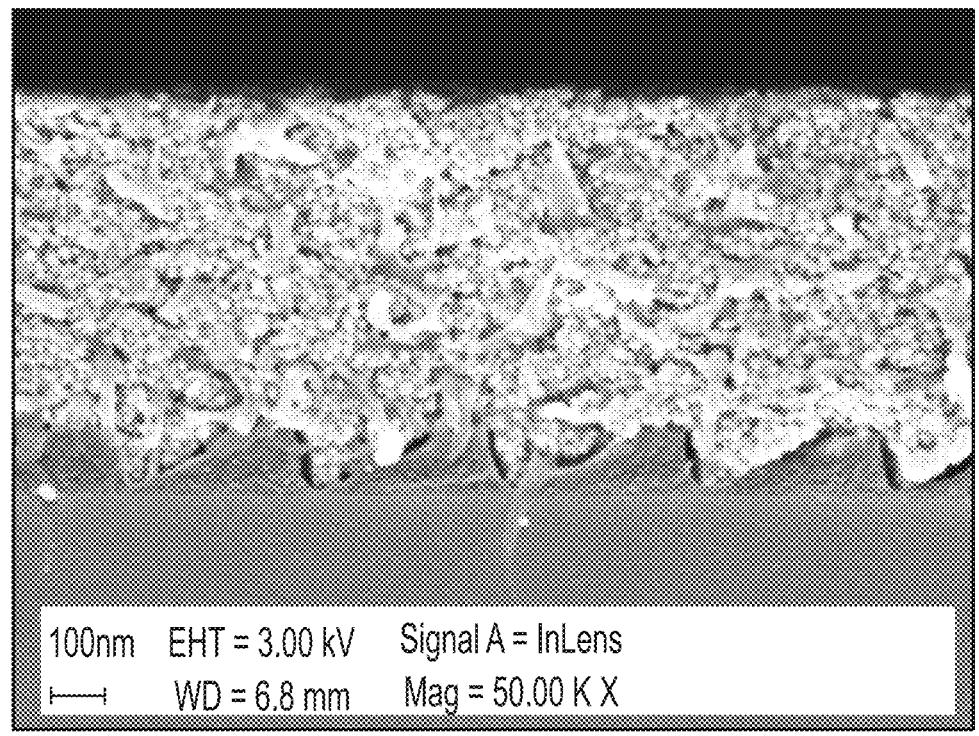
Figure 21A:
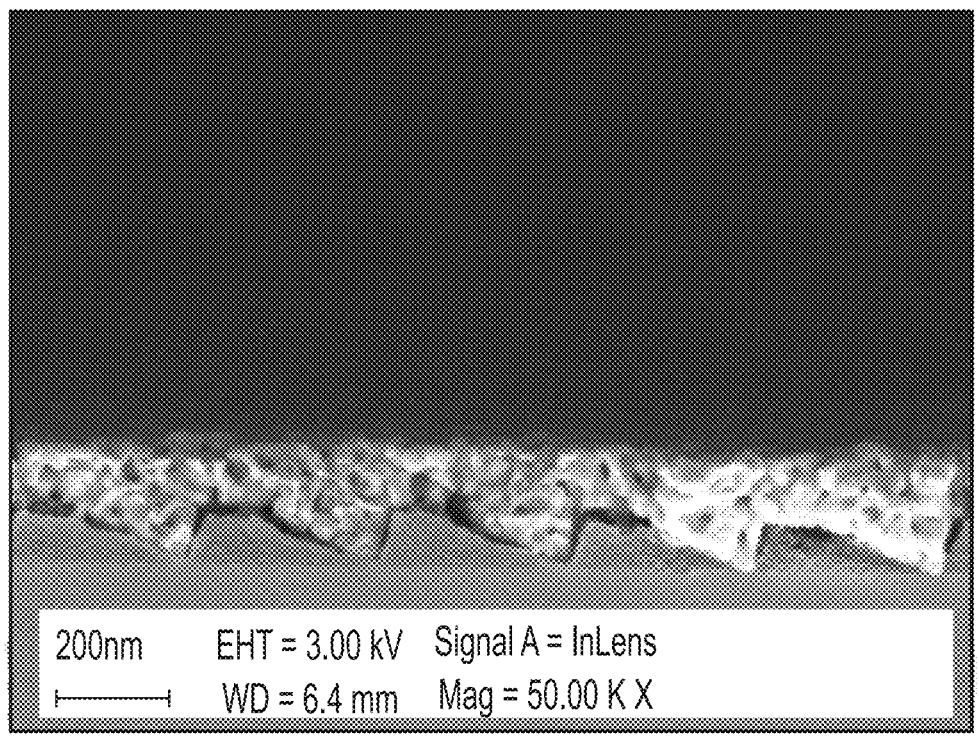
Figure 21B:
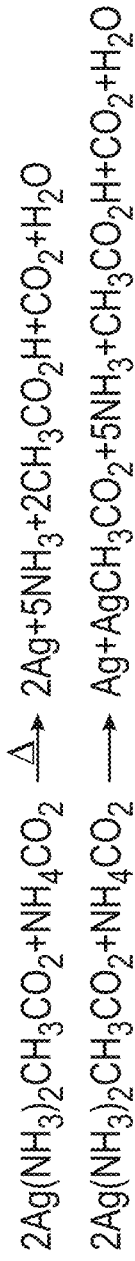
FIG. 21B is a schematic diagram of a "type 2" reaction for forming a silver layer using metal inks.
Figure 21C:
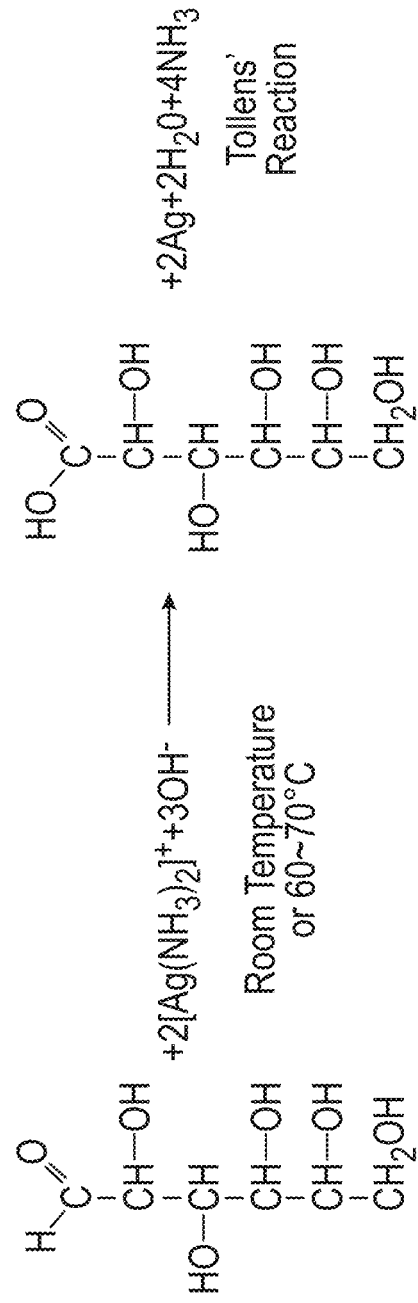
FIG. 21C is a schematic diagram of a "type 3" reaction for forming a silver layer using silver ion reduction in accordance with some embodiments.

Example 1: Comparison of Reflective Layers Formed by Metal Ion Reduction to Silver-Containing Inks Example of different methods for forming silver containing layers are shown in FIGS. 21A-C, including a "type 1" high silver compound loading (FIG. 21A), a "type 2" inorganic aqueous silver ion thermal deposition (FIG. 21B), and a "type 3" wet chemical silver ion reduction (Tollens reaction) in accordance with some embodiments herein (FIG. 21C).

Figure 22A:
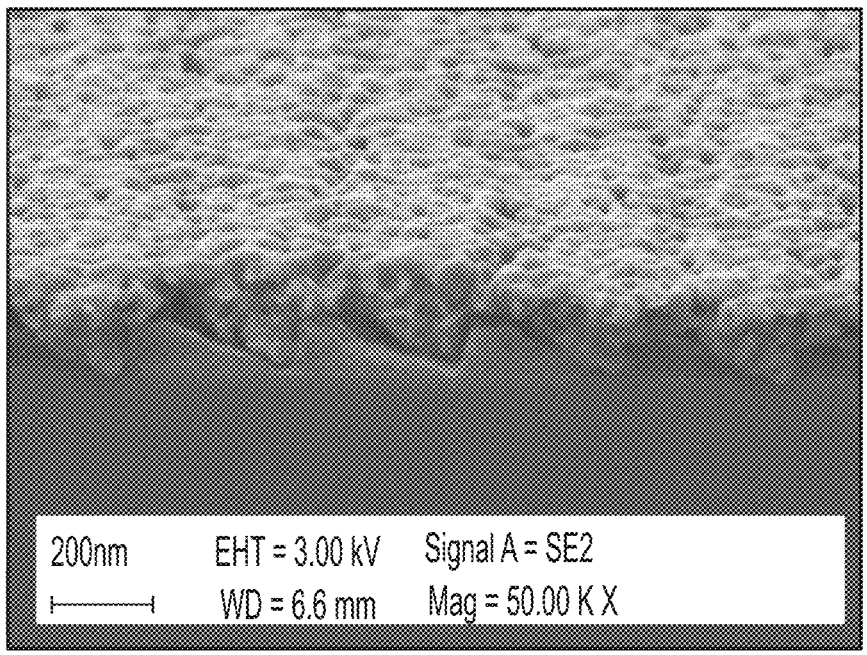
FIG. 22A is an electron micrograph of a silver layer formed by metal ink.
Figure 22B:
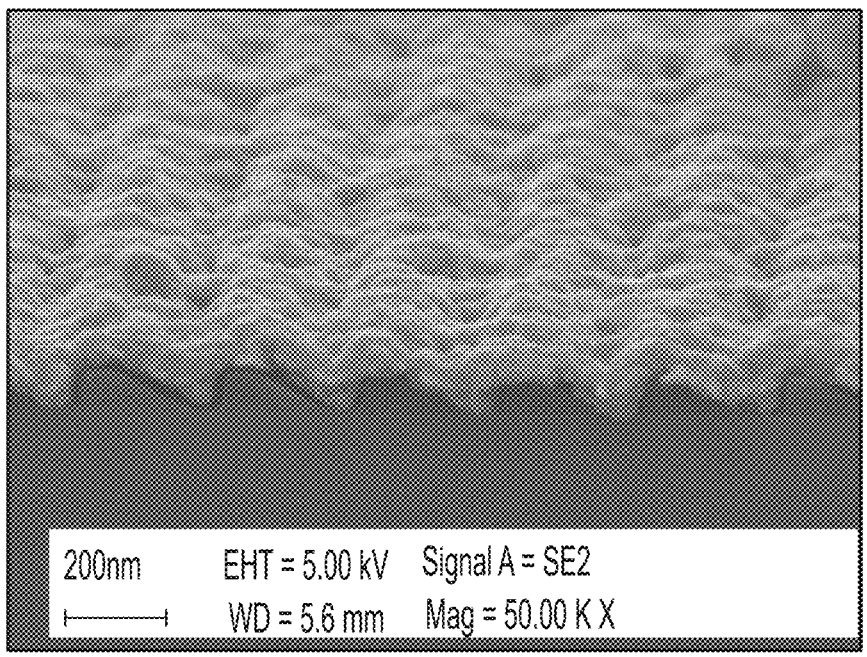
FIG. 22B is an electron micrograph of another silver layer formed by metal ink.
Figure 22C:
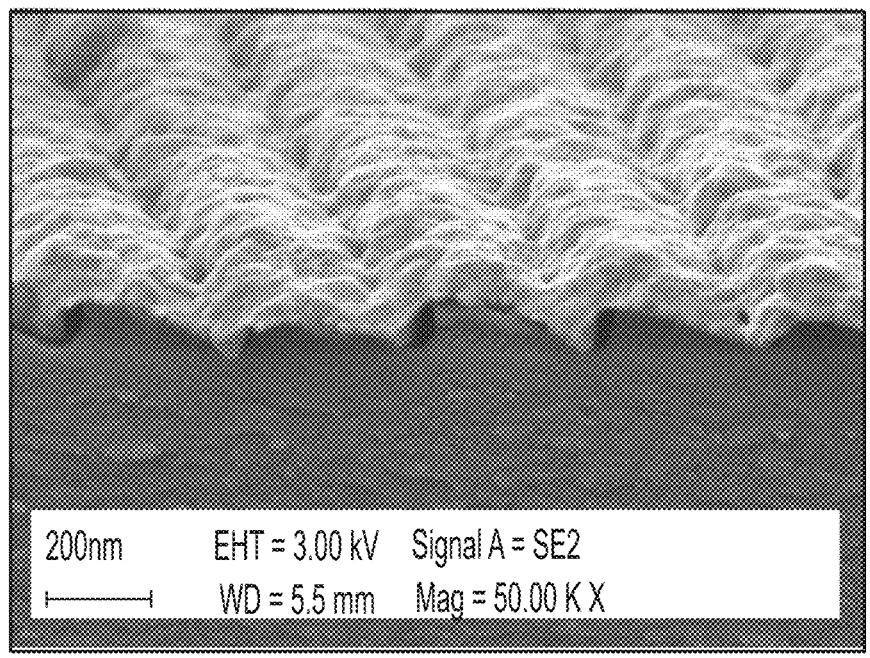
FIG. 22C is an electron micrograph of reflective layer formed using silver ion reduction in accordance with some embodiments.
Figure 22D:
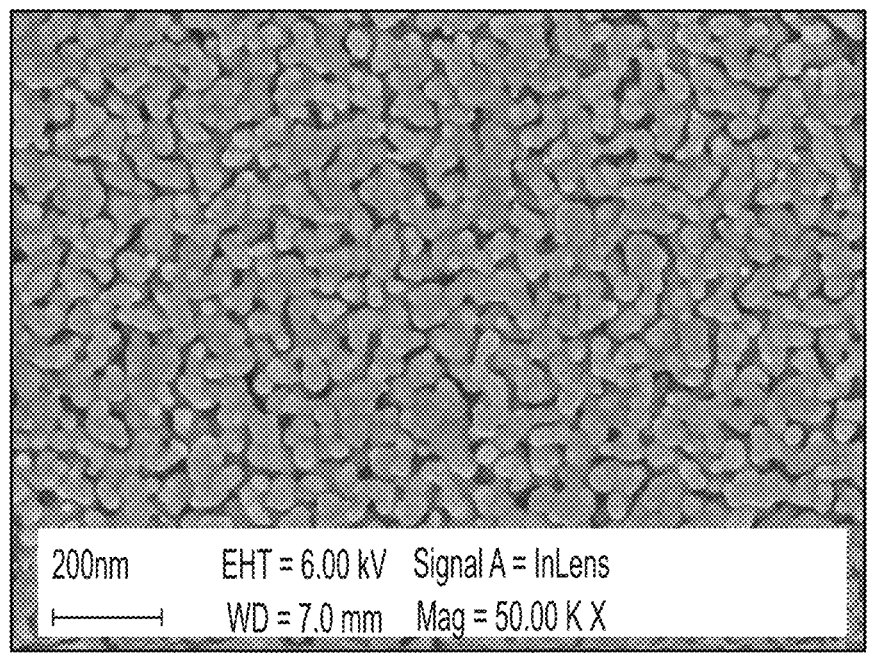
FIG. 22D is an electron micrograph of a tape off test of a silver layer formed by metal ink.
Figure 22E:
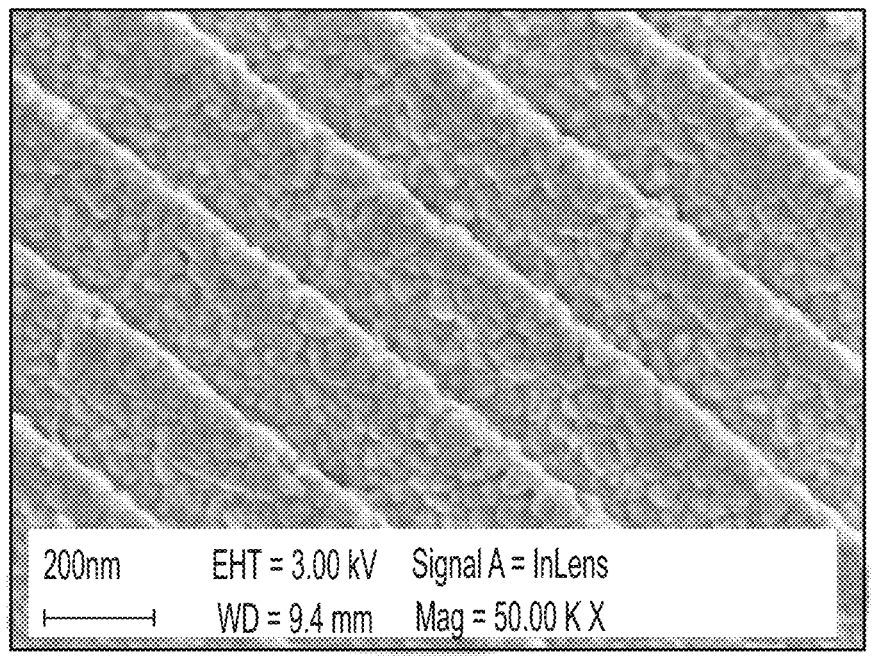
FIG. 22E is an electron micrograph of another tape off test of a silver layer formed by metal ink.
Figure 22F:
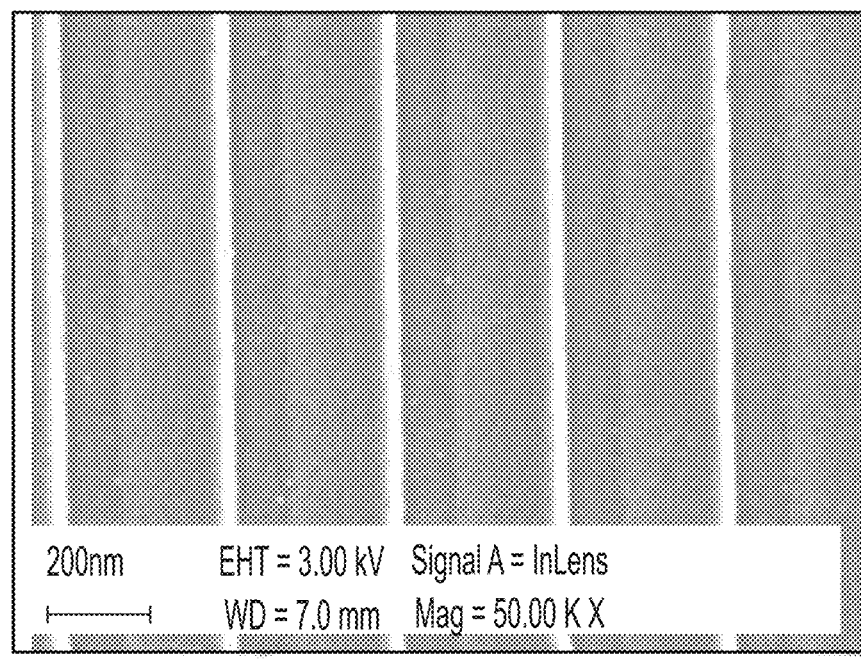
FIG. 22F is an electron micrograph of a tape off test of a silver layer formed using silver ion reduction in accordance with some embodiments.

Methods of making reflective layers via silver ion reduction as described herein were compared to other methods of making reflective layers. The comparison was performed on in-coupling grating (ICG) nanopatterned structure. The coating property ratings using the different methods are shown in Table 1. Reflective layers comprising silver, in accordance with some embodiments, were formed using a modified Tollens' reaction. This reaction was done at room temperature, and generated high purity silver with fine smoothness (pinhole free) at nanoscale (FIG. 22C, illustrated after rinsing). The coating was also highly conformal around the ICG nanostructure. In comparison, inkjetable ink from NovaCentrix of Austin, Texas (FIG. 22A), and inkjetable ink from Electroninks (FIG. 22B) contained substantial numbers of pinholes, forming a nanoporous network associated with high conductivity but relatively low reflectivity. The adhesion of the reflective layer as described herein was also evaluated using a tape off test. Compared to inkjetable ink from NovaCentrix (FIG. 22D), and inkjetable ink from Electroinks (silver tape off from glass) (FIG. 22E), the reflective layer formed by using the modified Tollens reaction in accordance with some embodiments herein (FIG. 22F) exhibited substantially greater adhesion. It is noted that for the tape-off test, the reflective layer of some embodiments was deposited on 3 nm SiOx coated ICG. These results are summarized in Tables 1A-B, below:

TABLE 1A

Property ratings of different silver coating examples tested.

| | Nanoscale smoothness | Purity | Conformal coverage | Adhesion |
|---|---|---|---|---|
| Reflective Layer formed by silver ion reduction (modified Tollens' reaction) | E | E | E | E |
| Electroninks particle-free ink | G | G | G | A |
| NovaCentrix nanoparticle ink RFLC17 | A | G | G | E |

E: excellent;
G: good;
A: acceptable

TABLE 1B

Tested Commercial Silver Inks

| Supplier | Ink Type | Status |
|---|---|---|
| NovaCentrix | Nanoparticle Ag | RFLC17 shows ICG diffraction efficiency 24.4% (red) |
| Liquid X | Particle Free Ag | Samples did not have great reflectivity at the glass/metal (40%~70%), PET/metal interfaces (<50%) |
| DuPont | Nanoparticle Ag | Reflectance <50%, somewhat milky color |
| Electroninks | Particle Free Ag | ICG diffraction efficiency 31% (red), |

Thus, in it has been shown that reflective layers in accordance with some embodiments herein possess smoother surfaces (which are free or substantially free of pinholes), and exhibit superior adhesion to layers formed from inkjetable metal-containing inks.

Example 2: Comparison of Reflective Layers to Vapor Deposition Metal Layers and Silver-Containing Inks Plasma pre-treatment of the nanostructured photoresist, yielded excellent adhesion. The reflectivity and ICG diffraction efficiency was tested for a reflective layer comprising silver generated by the modified Tollens' reaction on 385 resist treated with APPJ plasma, and compared to a sputter aluminum deposited-layer on 385 resist, and an inkjetable ink from NovaCentrix that was baked at 180° C. for 15 minutes. The reflective layer comprising silver generated by the modified Tollens' reaction exhibited clearly higher reflectivity that the tested commercial metal inks and also higher than the aluminum coating by vapor deposition (FIG. 23). Moreover, the reflective layer comprising silver generated by the modified Tollens' reaction exhibited the higher reflectivity for all wavelengths tested in the 400-700 nm range (FIG. 23).

Reflectance and diffraction efficiency are summarized in Tables 2A-B below:

TABLE 2A

| Coating Type | Mechanism of Deposition | Reflectance | ICG Diffraction Efficiency |
|---|---|---|---|
| Al dep (POR) | Vapor deposition | Blue 82~83% Green 81~83%, Red 81~82% | Blue 28% (some prism absorption), Green 29~37%, >33% if good, Red 39% |
| Reflective layer formed from silver ion reduction | Modified Tollens' reaction (wet chemical reaction in aqueous solution) | Blue 87~91% Green 89~94%, Red 90~95% | Blue 33% (some prism absorption), Green 38~41%, Red 43% |
| NovaCentrix ink | Organic silver compounds thermal decomposition, Ag nanoparticle sintering | Blue ~55%, Green ~70%, Red 84~85% | Red No baking or 140° C., 1 min 18%; 180° C., 20 min 24% |
| Electroninks ink | Particle free Ag, Organic/inorganic silver compound thermal decomposition | Blue 22~62%, Green 36~65%, Red 42~76% | Red 31% |

TABLE 2B

Property ratings of different silver coating examples tested.

| | Process temperature compatibility with the nanopatterning materials | Reflectivity | ICG diffraction efficiency |
|---|---|---|---|
| Reflective Layer (modified Tollens' reaction) | E | E | E |
| Electroninks particle-free ink | G | G | G |
| NovaCentrix nanoparticle ink RFLC17 | A | G | A |

E: excellent;
G: good;
A: acceptable

Advantageously, the reflective layer formed by silver ion precipitation was highly smooth, exhibited high reflectivity, excellent adhesion, and could be formed at room temperature. The aluminum vapor-deposited layer was stable, but exhibited lower reflectance and diffraction efficiency, and was also hampered by challenges associated with stencil use. The metal containing-inks from NovaCentrix and Electroninks exhibited lower reflectance and diffraction efficiency, and required a bake step, which would lengthen the production time, and impact thermal budget for some waveguides.

Additionally, the reflective layer formed by silver ion precipitation exhibited superior eyepiece efficiency compared to sputtered aluminum. The D55 green efficiency for the reflective layer formed by silver ion precipitation was 4.5-4.9% (for 4-5 eye pieces), compared to about 3.9% for sputtered aluminum.

Thus, it can be concluded that reflective layers in accordance with methods and devices of some embodiments exhibit superior reflectivity and superior diffraction efficiency compared to layers formed from metal-containing inks, and Al layers formed by vapor deposition.

Example 3: Effects of Surface Treatment

Effects of surface treatment were evaluated for reflective layers deposited by silver ion reduction as described herein.

As a control, an imprint area on resist without pretreatment exhibited a very thin Ag coating (only a faint residue after a gentle water wash).

Resist was washed with acetone at the imprint area. This pretreatment resulted in a thin semitransparent silver coating. While the silver was thicker than the areas with no acetone wash, it was still very thin, and unlikely to have sufficient reflectivity for many applications.

Resist was pretreated with an ultra thin atmospheric pressure plasma jet (APPJ) coating. The plasma jet coating yielded high reflectivity and acceptable adhesion with a SnCl$_2$ catalyst.

Resist was pretreated with plasma. This pretreatment yielded high reflectivity and excellent adhesion.

A glass only area yielded about ~100 nm silver coating. This coating was highly reflective, exhibiting better reflectivity than the aluminum layer formed by vapor deposition.

The results of these pretreatments are summarized in Table 3, below:

TABLE 3

|  | Reflectance | Adhesion |
|---|---|---|
| Resist, no treatment | Low | Poor |
| Glass | High | OK |
| Resist + acetone rinse | Low | Poor |
| Resist + ultra thin APPJ coating | High | Ok with $SnCl_2$ |
| Resist + plasma treatment | High | Excellent |

Example 4: Stability of Reflective Layer without Capping

Figure 24:
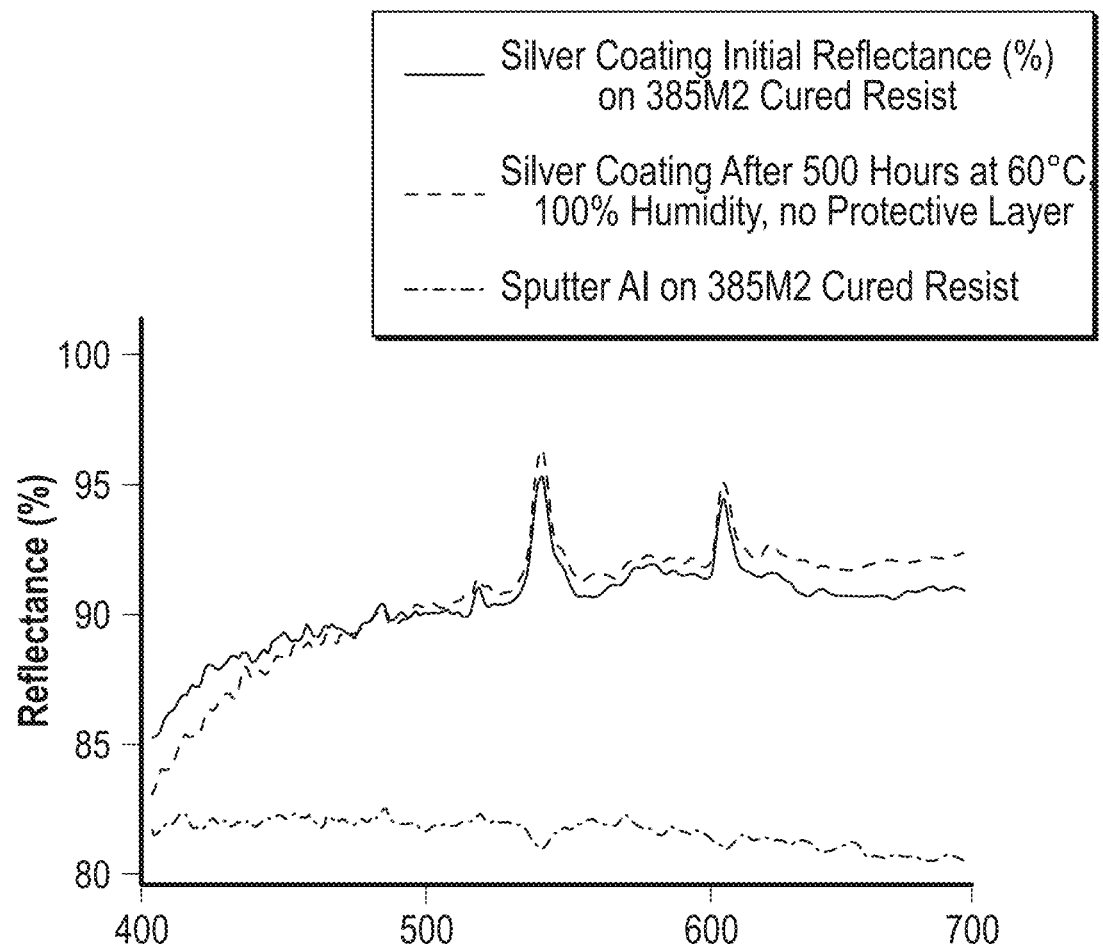
FIG. 24 is a graph showing stability of silver layers formed using silver ion reduction, and of aluminum layers formed by vapor deposition.
Figure 25:
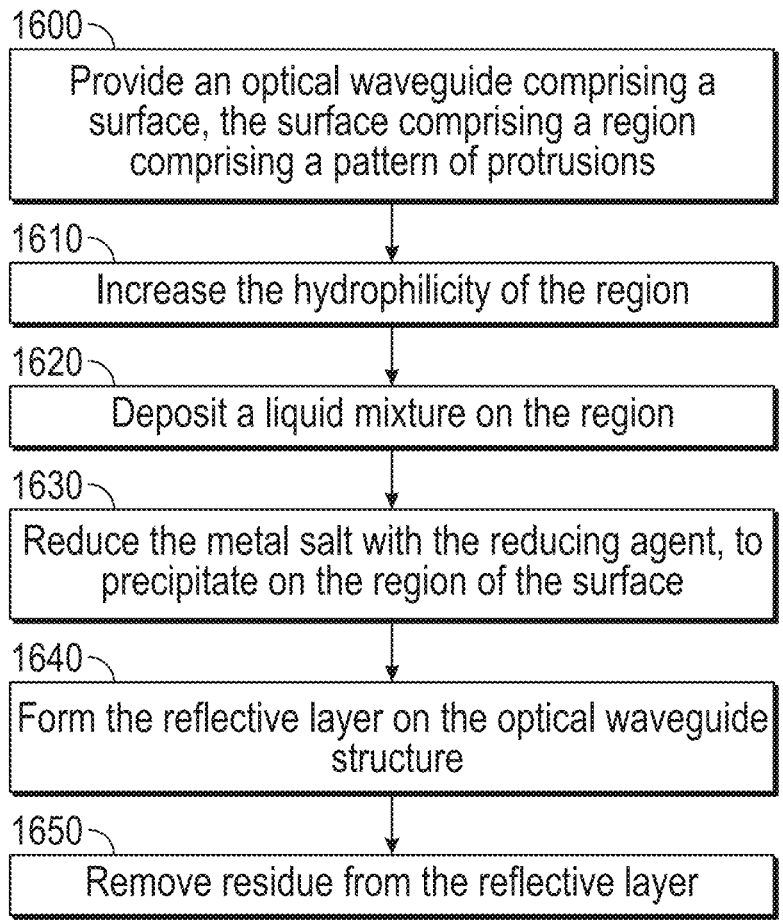
FIG. 25 is a flow diagram illustrating a method of making an optical waveguide structure as described herein.

Stability of a reflective layer formed by silver ion reduction as described herein (which may also be referred to as "in-house silver") was measured. The reflectivity of the reflective layer formed by silver ion reduction on 385M2 cured resist (without capping) both initially, and after 500 hours at 60° C. in 100% humidity. The reflectivity of an aluminum layer formed by vapor deposition was also measured. As shown in FIG. 24, the reflective layer formed by silver ion reduction exhibited excellent stability, with little change in reflectivity across all tested wavelengths (400-700 nm) between the initial sample, and the sample after 500 hours at 60° C. in 100% humidity. Both the initial reflective layer and the 500 hour at 60° C. in 100% humidity reflective layers formed by silver ion reduction (in accordance with some embodiments herein) exhibited superior reflectivity to the aluminum sample.

ICG diffraction efficiency was also measured for reflective layer formed by silver ion reduction, both initially and after 360 hours at 60° C. in 100% humidity. The results are shown in Table 4 below. Table 4 indicates that diffraction efficiency did not change substantially even after the reflective layer of some embodiments was at 100% humidity for 360 hours:

TABLE 4

|  | TM | TE | Average |
|---|---|---|---|
| D34 green initial | 58.1% | 17.9% | 38.0% |
| D34 green after 360 hours 60° C., 100% humidity | 56.3% | 15.3% | 35.8% |

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the augmented reality content disclosed herein may also be displayed by systems that provide images on a single depth plane.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a." "an." "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely." "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A display system comprising:
  a waveguide including a first major surface and a second major surface opposite the first major surface;
  projection optics configured to project a beam of light toward the second major surface of the waveguide; and an in-coupling optical element disposed on the second major surface of the waveguide, the in-coupling optical element including a diffractive region configured to in-couple light that is incident on the diffractive region such that the light propagates by total internal reflection in a first direction within the waveguide, wherein the diffractive region is configured, to mitigate re-bounce of in-coupled light propagating in the waveguide, such that a first portion of the beam of light is incident on the diffractive region and at least partly in-coupled into the waveguide, and wherein a second portion of the beam of light impinges on the waveguide without being incident on the diffractive region, and wherein the diffractive region is configured to reduce a length of the diffractive region along which re-bounce occurs for an in-coupled, outward angled beam component of the beam of light.

2. The display system of claim 1, wherein the in-coupling optical element is disposed beyond a focal distance of the projection optics, and wherein the light projected by the projection optics is diverging when it reaches the in-coupling optical element.

3. The display system of claim 1, wherein the in-coupling optical element is disposed closer to the projection optics than a focal distance of the projection optics, and wherein the light projected by the projection optics is converging when it reaches the in-coupling optical element.

4. The display system of claim 1, wherein the diffractive region is asymmetric about a beam axis that extends from the projection optics and is perpendicular to the second major surface of the waveguide.

5. The display system of claim 4, wherein the diffractive region is radially asymmetric about the beam axis.

6. The display system of claim 4, wherein the diffractive region is reflectively asymmetric about an axis of symmetry that is perpendicular to the first direction at the beam axis.

7. The display system of claim 1, wherein the diffractive region is a high-efficiency diffractive region, and wherein the in-coupling optical element further includes a low-efficiency diffractive region configured such that the second portion of the beam of light from the projection optics is incident on the low-efficiency diffractive region.

8. The display system of claim 7, wherein the high-efficiency diffractive region is a reflective diffractive region comprising a metalized grating portion, and wherein the low-efficiency diffractive region comprises a non-metalized grating portion.

9. The display system of claim 1, wherein the second portion of the beam of light propagates out of the waveguide through the second major surface without being in-coupled into the waveguide.

10. The display system of claim 1, wherein the second portion of the beam of light is in-coupled into the waveguide at a lower efficiency relative to the first portion of the beam of light.

11. The display system of claim 1, further comprising a waveguide stack including the waveguide, the waveguide stack further comprising:
a second waveguide comprising a first major surface and a second major surface; and
a second in-coupling optical element disposed on the second major surface of the second waveguide, the second in-coupling optical element comprising a second diffractive region covering a larger proportion of an area defined by a second beam of light from the projection optics, relative to a proportion covered by the diffractive region of an area defined by the beam of light.

12. The display system of claim 11, wherein the second diffractive region is configured to in-couple substantially all of the second beam of light.

13. The display system of claim 11, wherein the diffractive region is asymmetric about a beam axis that extends from the projection optics and is perpendicular to the second major surface of the waveguide, and wherein the second diffractive region is symmetric about the beam axis.

14. The display system of claim 13, wherein the diffractive region is radially asymmetric about the beam axis, and wherein the second diffractive region is radially symmetric about the beam axis.

15. The display system of claim 13, wherein the diffractive region is reflectively asymmetric about an axis of symmetry that is perpendicular to the first direction at the beam axis, and wherein the second diffractive region is reflectively symmetric about the axis of symmetry that is perpendicular to the first direction at the beam axis.

16. The display system of claim 13, wherein a width of the diffractive region is different than a length of the diffractive region, to reduce an occurrence of the re-bounce of the in-coupled light propagating in the waveguide relative to a diffractive region of substantially equal length and width.

17. The display system of claim 16, wherein the width of the diffractive region parallel to the first direction is shorter than the length of the diffractive region perpendicular to the first direction.

18. The display system of claim 17, wherein the width is less than 80% of the length.

19. The display system of claim 11, wherein the second waveguide is disposed between the waveguide and the projection optics, and wherein the waveguide is spaced from the projection optics by a distance greater than a focal distance of the projection optics.

* * * * *